United States Patent
Koorapaty et al.

(10) Patent No.: US 12,035,246 B2
(45) Date of Patent: Jul. 9, 2024

(54) WIRELESS DEVICE, FIRST NETWORK NODE, SECOND NETWORK NODE, AND METHODS PERFORMED THEREBY, FOR HANDLING A POWER OF TRANSMISSION

(71) Applicant: Telefonaktiebolaget LM Ericsson (PUBL), Stockholm (SE)

(72) Inventors: Havish Koorapaty, Saratoga, CA (US); Ravikiran Nory, San José, CA (US); Ajit Nimbalker, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 302 days.

(21) Appl. No.: 17/599,189

(22) PCT Filed: Mar. 27, 2020

(86) PCT No.: PCT/EP2020/058775
§ 371 (c)(1),
(2) Date: Sep. 28, 2021

(87) PCT Pub. No.: WO2020/201119
PCT Pub. Date: Oct. 8, 2020

(65) Prior Publication Data
US 2022/0191802 A1    Jun. 16, 2022

Related U.S. Application Data
(60) Provisional application No. 62/826,613, filed on Mar. 29, 2019.

(51) Int. Cl.
*H04W 52/14* (2009.01)
*H04W 52/34* (2009.01)

(52) U.S. Cl.
CPC ......... *H04W 52/146* (2013.01); *H04W 52/34* (2013.01)

(58) Field of Classification Search
CPC ............. H04W 52/146; H04W 52/34; H04W 72/0446; H04W 76/15; H04W 52/367;
(Continued)

(56) References Cited

U.S. PATENT DOCUMENTS

| | | | |
|---|---|---|---|
| 2008/0248760 A1* | 10/2008 | Booker | H04W 52/54 455/88 |
| 2011/0268032 A1* | 11/2011 | Kim | H04W 72/04 370/328 |

(Continued)

FOREIGN PATENT DOCUMENTS

| | | |
|---|---|---|
| CN | 105981441 A | 9/2016 |
| CN | 106576366 A | 4/2017 |

(Continued)

OTHER PUBLICATIONS

Apple Inc: "Feature lead summary #83 for uplink power control for NR-NR DC", Nov. 2019, 3gpp Draft; R1-1913550, 3rd Generation Partnership Project (3GPP), XP051830831, URL:https://ftp. 3gpp. org/tsg_ran/WG1_RL1/TSGR1_99/Docs/R1-1913550.zip R1-1913550. docx (Year: 2019).*

(Continued)

*Primary Examiner* — Lana N Le
(74) *Attorney, Agent, or Firm* — Baker Botts L.L.P.

(57) ABSTRACT

A method performed by a wireless device configured with dual connectivity between a first group of cells and a second group of cells is provided. The method includes determining a limit of a power of transmission of a first uplink transmission in the first group of cells. The limit is determined based on an identified second uplink transmission in the second group of cells overlapping in time with the first uplink transmission. The method further includes setting the power of transmission for the first uplink transmission based (Continued)

on the limit. Methods performed by a first network node and/or a second network node are also provided.

16 Claims, 12 Drawing Sheets

(58) Field of Classification Search
CPC ........... H04W 72/0473; H04W 52/346; H04W 52/30; H04W 88/02; H04W 72/21; H04W 52/18; H04W 88/06; H04W 16/14; H04W 52/54; H04W 52/248; H04W 52/16; H04W 92/10; H04W 76/00; H04W 72/044
See application file for complete search history.

(56) References Cited

U.S. PATENT DOCUMENTS

| | | | |
|---|---|---|---|
| 2012/0039205 A1* | 2/2012 | Kogure | H04W 52/367 370/252 |
| 2013/0331137 A1* | 12/2013 | Burchill | H04W 52/248 455/501 |
| 2015/0018028 A1* | 1/2015 | Uplenchwar | H04W 52/367 455/522 |
| 2015/0237626 A1* | 8/2015 | Li | H04W 72/21 |
| 2015/0271761 A1 | 9/2015 | Park | |
| 2015/0282103 A1 | 10/2015 | Immonen et al. | |
| 2015/0304957 A1 | 10/2015 | Noh et al. | |
| 2016/0021618 A1 | 1/2016 | Yin et al. | |
| 2016/0262180 A1 | 9/2016 | Rahman et al. | |
| 2016/0353343 A1 | 12/2016 | Rahman et al. | |
| 2017/0230917 A1* | 8/2017 | Ouchi | H04W 52/146 |
| 2018/0270856 A1 | 9/2018 | Rahman et al. | |
| 2019/0124685 A1 | 4/2019 | Rahman et al. | |
| 2019/0132802 A1* | 5/2019 | Kusashima | H04W 52/18 |
| 2020/0022097 A1* | 1/2020 | Wang | H04W 52/146 |
| 2020/0120688 A1* | 4/2020 | Kim | H04W 72/21 |
| 2022/0303912 A1* | 9/2022 | Meshkati | H04W 52/367 |

FOREIGN PATENT DOCUMENTS

| | | |
|---|---|---|
| EP | 3 209 069 A1 | 8/2017 |
| JP | 2015 185891 A | 10/2015 |
| WO | 2015 186994 A1 | 12/2015 |
| WO | 2016 091276 A1 | 6/2016 |
| WO | 2018 074071 A1 | 4/2018 |

OTHER PUBLICATIONS

Notice of Reasons for Rejection issued for Japanese Patent Application No. 2021-557788—dated Nov. 29, 2022.
3GPP TSG RAN WG1 Meeting 91; Reno, USA; Source: InterDigital, Inc.; Title: Power Control for NR CA (R1-1720559 (Revision of parts of R1-1718366))—Nov. 27-Dec. 1, 2017.
PCT International Search Report issued for International application No. PCT/EP2020/058775—dated Oct. 26, 2020.
PCT Written Opinion of the Internatinoal Searching Authority issued for International application No. PCT/EP2020/058775—dated Oct. 26, 2020.
Notice of First Review issued for Chinese Patent Application Serial No. 202080026033.7—Mar. 29, 2024.

\* cited by examiner

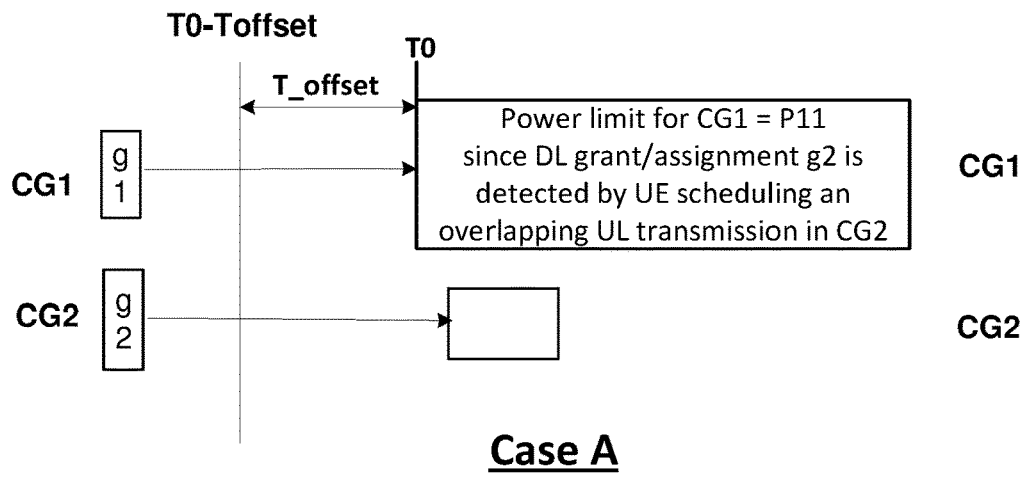
Case A
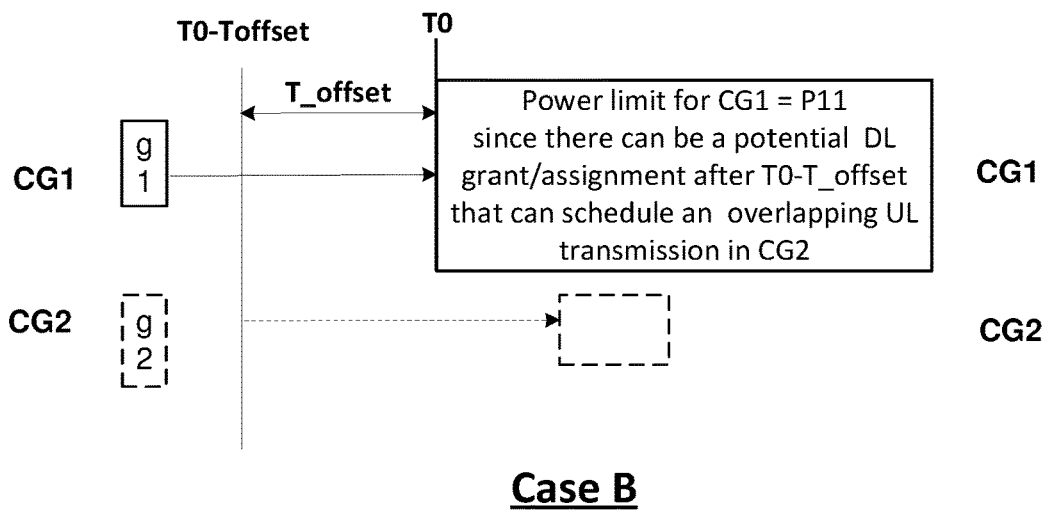
Case B
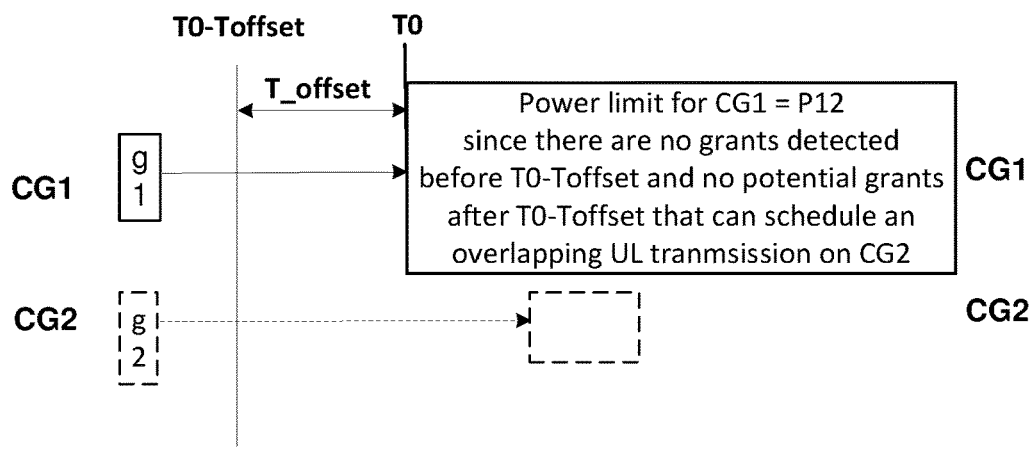
Case C
Figure 5 a)
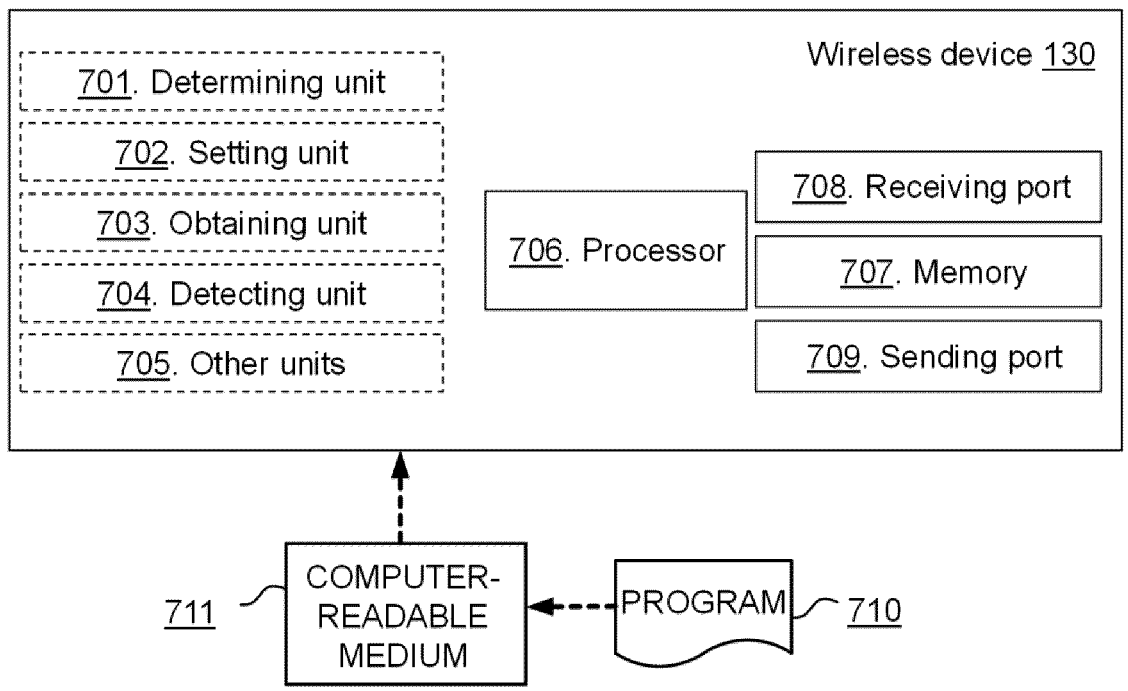
b)
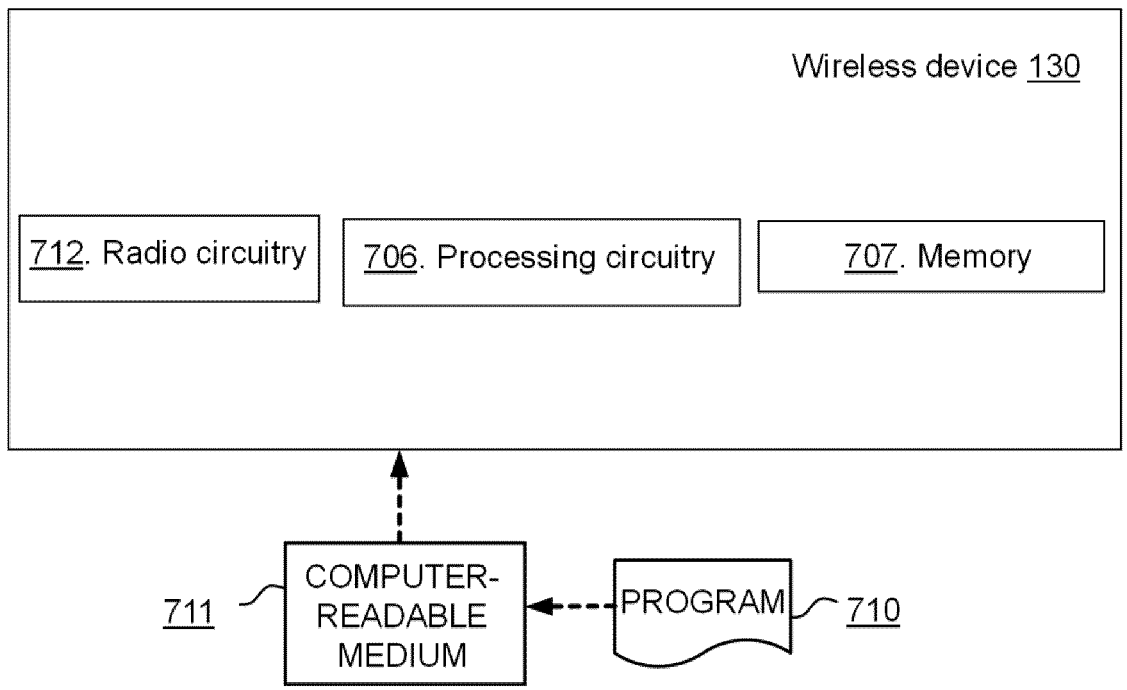
Figure 7 a)
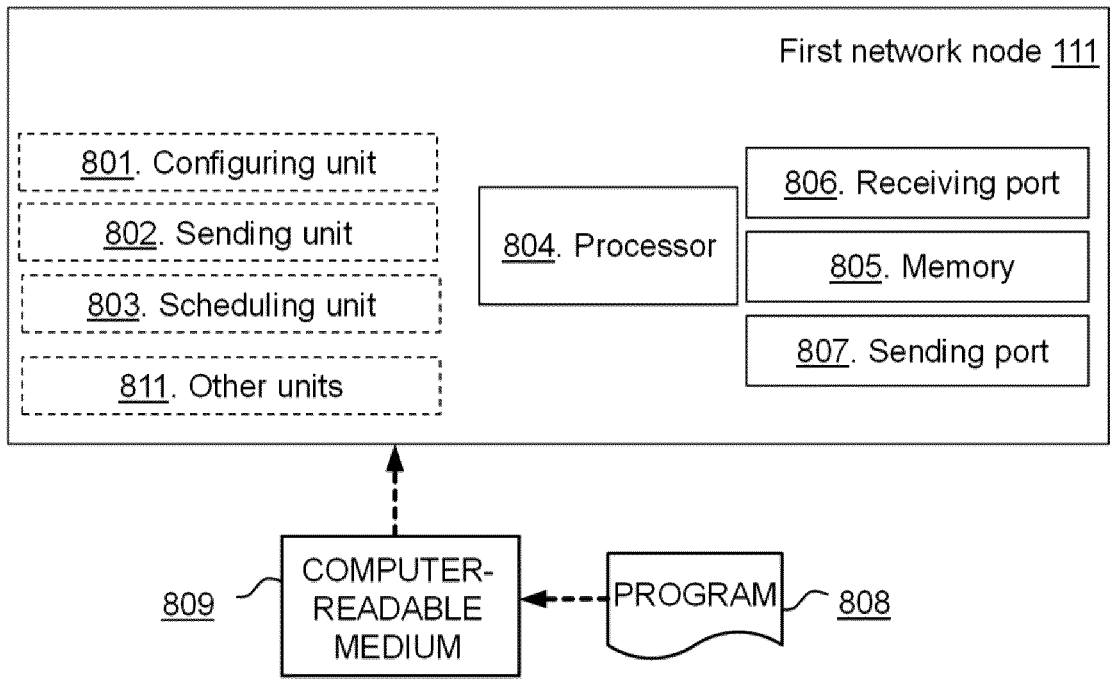
b)
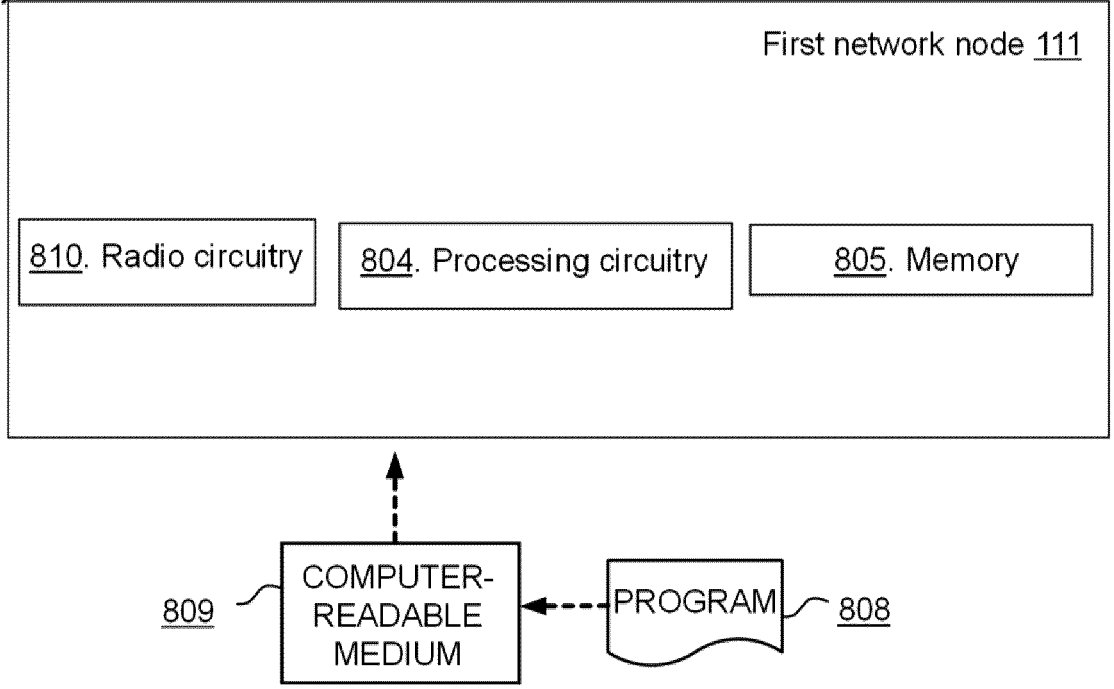
Figure 8 a)
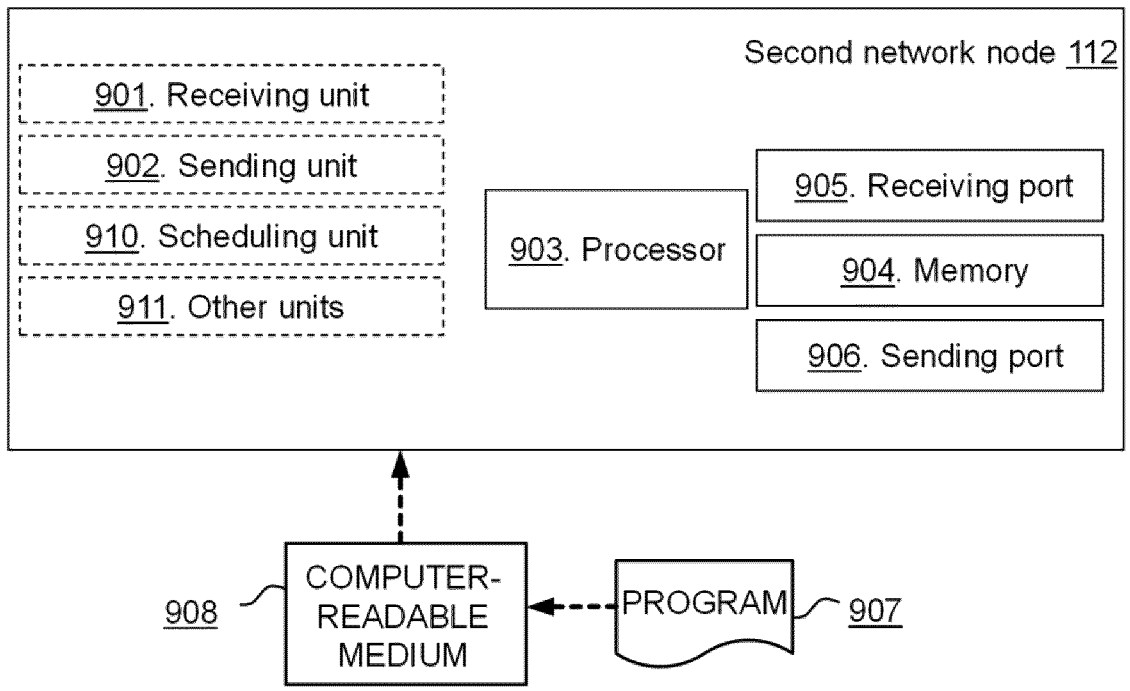
b)
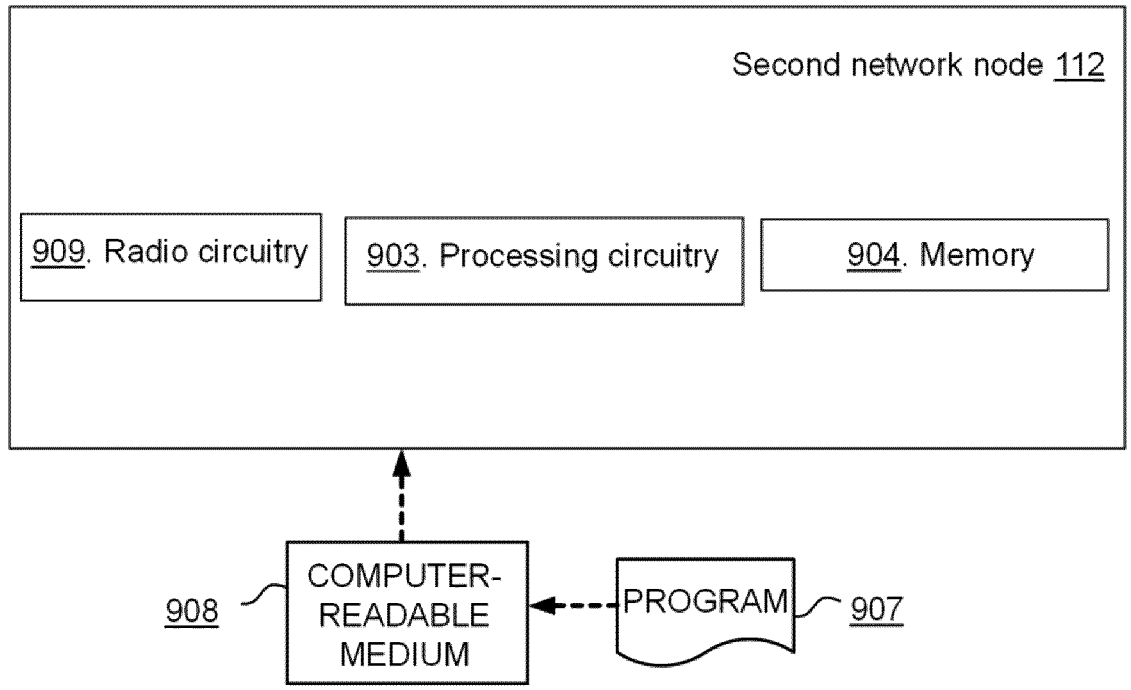
Figure 9

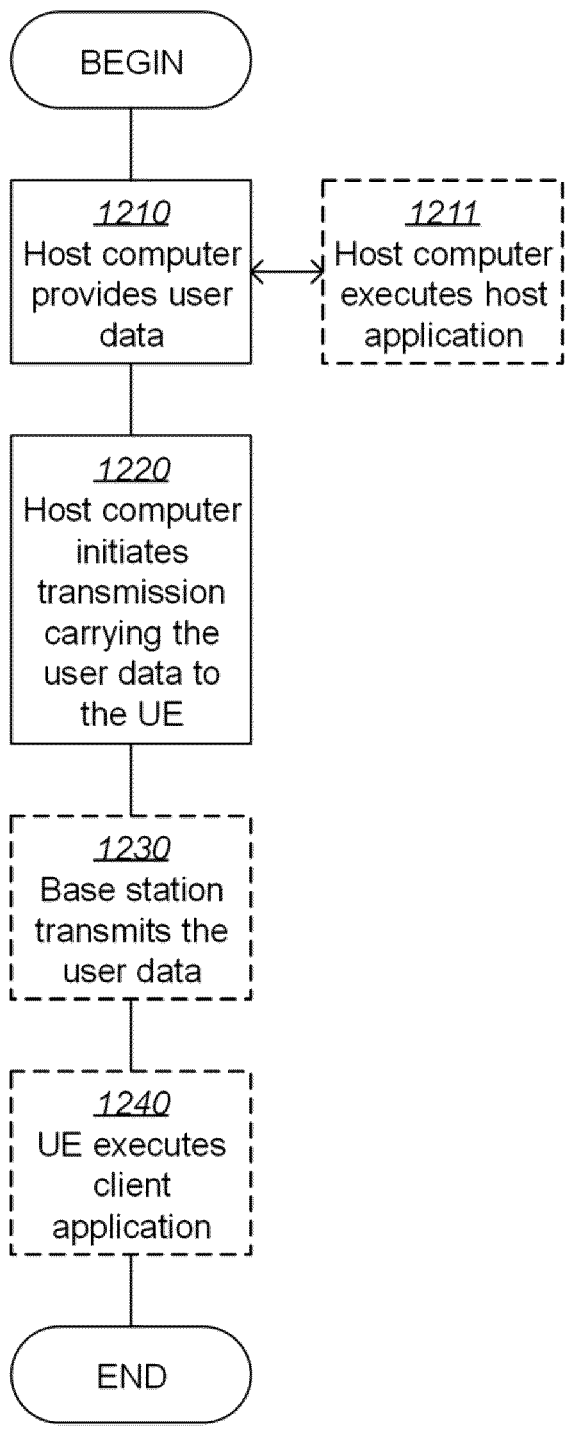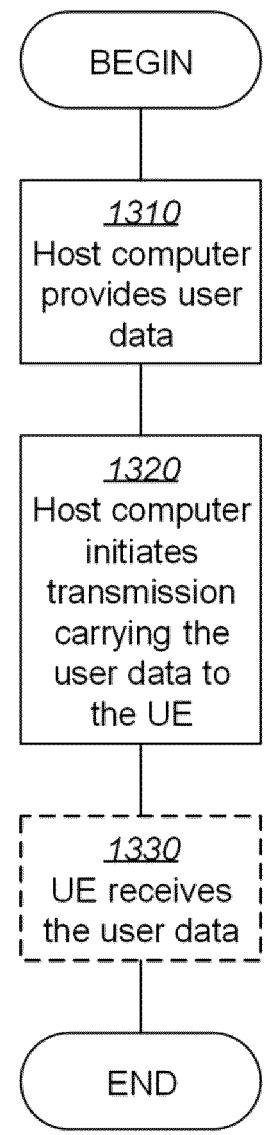
FIG. 12
FIG. 13

WIRELESS DEVICE, FIRST NETWORK NODE, SECOND NETWORK NODE, AND METHODS PERFORMED THEREBY, FOR HANDLING A POWER OF TRANSMISSION

PRIORITY

This nonprovisional application is a U.S. National Stage Filing under 35 U.S.C. § 371 of International Patent Application Serial No. PCT/EP2020/058775 filed Mar. 27, 2020 and entitled "WIRELESS DEVICE, FIRST NETWORK NODE, SECOND NETWORK NODE, AND METHODS PERFORMED THEREBY, FOR HANDLING A POWER OF TRANSMISSION" which claims priority to U.S. Provisional Patent Application No. 62/826,613 filed Mar. 29, 2019 both of which are hereby incorporated by reference in their entirety.

TECHNICAL FIELD

The present disclosure relates generally to wireless communications systems and, more particularly, to wireless devices, network nodes, and methods performed thereby for handling a power of transmission.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Multi-Carrier operation will now be described.

In multicarrier or carrier aggregation (CA) operation, a UE may be able to receive and/or transmit data to more than one serving cell. In other words, a CA capable UE may be configured to operate with more than one serving cell. The carrier of each serving cell may be generally called as a component carrier (CC). In simple words, the component carrier (CC) may be understood to mean an individual carrier in a multi-carrier system. The term carrier aggregation (CA) may be also called, e.g., interchangeably called, "multi-carrier system", "multi-cell operation", "multi-carrier operation", "multi-carrier" transmission and/or reception. This may be understood to mean the CA may be used for transmission of signaling and data in the uplink and downlink directions. One of the CCs is the primary component carrier (PCC), or simply primary carrier, or even anchor carrier. The remaining ones may be called secondary component carrier (SCC), or simply secondary carriers, or even supplementary carriers. The serving cell may be interchangeably called as primary cell (PCell) or primary serving cell (PSC). Similarly, the secondary serving cell may be interchangeably called as secondary cell (SCell) or secondary serving cell (SSC).

Generally, the primary or anchor CC may carry the UE specific signalling that the UE may need. The primary CC, a.k.a. PCC or PCell, may exist in both uplink and downlink directions in CA. In case there is single UL CC, the PCell may be on that CC. The network may assign different primary carriers to different UEs operating in the same sector or cell.

In Dual Connectivity (DC) operation, the UE may be served by at least two nodes called master eNB (MeNB) and secondary eNB (SeNB). More generally, in multiple connectivity, a.k.a., multi-connectivity, operation, the UE may be served by two or more nodes where each node may operate or manages one cell group, e.g., MeNB, SeNB1, SeNB2 and so on. More specifically, in multi-connectivity, each node may serve or manage at least secondary serving cells belonging its own cell group. Each cell group may contain one or more serving cells. The UE may be configured with PCC from both MeNB and SeNB. The PCell from MeNB and SeNB may be called as PCell and PSCell, respectively. The UE may also be configured with one or more SCCs from each of MeNB and SeNB. The corresponding secondary serving cells served by MeNB and SeNB may be called SCells. The UE in DC may typically have separate Transmitter/Receiver (TX/RX) for each of the connections with MeNB and SeNB. This may allow the MeNB and SeNB to independently configure the UE with one or more procedures e.g., radio link monitoring (RLM), Discontinued Reception (DRX) cycle etc. on their PCell and PSCell respectively.

In multiconnectivity, all cell groups may contain serving cells of the same Radio Access Technology (RAT), e.g., LTE, or different cell groups may contain serving cells of different RATs.

Dual Connectivity will now be described.

Evolved Universal Terrestrial Radio Access Network (E-UTRAN) may support Dual Connectivity (DC) operation, whereby a multiple Rx/Tx UE in RRC_CONNECTED may be configured to utilize radio resources provided by two distinct schedulers, located in two eNBs connected via a non-ideal backhaul over the X2 interface (see 3GPP 36.300). DC operation may be understood to advantageously provide data aggregation by using more than one link, as well as link diversity for robustness. eNBs involved in DC for a certain UE may assume two different roles: an eNB may either act as a Master node (MN) or as a Secondary node (SN). In DC, an MN may be understood, for example, as a radio network node which may terminate at least an interface between the radio network node and a Mobility Management Entity (MME). Such an interface may be, for example, an S1 control plane interface between an eNB and an MME (S1-MME). In DC, an SN may be understood as a radio network node that may be providing additional radio resources for a UE, but is not the MN. In DC, a UE may be connected to one MN and one SN.

Dual connectivity (DC) may generally be used in NR (5G) and LTE systems to improve UE transmit and receive data rate. With dual connectivity, the UE typically may operate initially a serving cell group called a master cell group (MCG). The UE may then be configured by the network with an additional cell group called a secondary cell group (SCG). Each cell group (CG) may have one or more serving cells. MCG and SCG may be operated from geographically non-collocated gNBs.

SUMMARY

According to various embodiments of inventive concepts, a method performed by a wireless device configured with dual connectivity between a first group of cells and a second group of cells is provided. The method includes determining a limit of a power of transmission of a first uplink transmission in the first group of cells. The limit is determined based on an identified second uplink transmission in the second group of cells overlapping in time with the first uplink transmission. The method further includes setting the power of transmission for the first uplink transmission based on the limit.

Corresponding embodiments of inventive concepts for a wireless device, computer products, and computer programs are also provided.

According to other embodiments of inventive concepts, a method performed by a first network node serving a first group of cells in a dual connectivity configuration in a communications network is provided. The method includes configuring one or more scheduling parameters for one or more transmissions by a wireless device. The configuring includes a delay between a downlink message and a corresponding uplink transmission to be greater than a time offset value. The method further includes sending a first message to a second network node. The first message includes an indication of the configured one or more scheduling parameters.

In some embodiments, further operations performed by the first network node include scheduling a first transmission of the one or more transmissions based on the configured one or more scheduling parameters.

In some embodiments, further operations performed by the first network node include sending an indication of one or more parameters to the wireless device. The one or more parameters are for a second group of cells.

Corresponding embodiments of inventive concepts for a first network node, computer products, and computer programs are also provided.

According to other embodiments of inventive concepts, a method performed by a second network node serving a wireless device using a second group of cells in a dual connectivity configuration in a communications network is provided. The method includes receiving a first message from a first network node. The first message includes an indication of one or more scheduling parameters configured by the first network node for one or more transmissions by the wireless device. The one of more scheduling parameters include a delay between a downlink message and a corresponding uplink transmission where the delay is greater than a time offset value.

In some embodiments, further operations performed by the second network node include sending an indication of one or more parameters to the wireless device wherein the one or more parameters are for the second group of cells.

In some embodiments, further operations performed by the second network node include scheduling a second transmission of the one or more transmissions based on the one or more scheduling parameters.

Corresponding embodiments of inventive concepts for a second network node, computer products, and computer programs are also provided.

According to other embodiments of inventive concepts, a method performed by a first network node or a second network node serving a first group of cells and a second group of cells, respectively, in a telecommunication network is provided. The method includes configuring at least one or more scheduling parameters for one or more transmissions by a wireless device. The configuring includes a delay between a downlink message and a corresponding uplink transmission to be greater than a time offset value.

Existing DC methods may lead to suboptimal performance of a network due to low coverage and data rate.

Various embodiments of the present disclosure may provide solutions to these and other potential problems. In various embodiments of the present disclosure, a wireless device and a network node(s) operation to provide a method for power sharing for New Radio-Dual Connectivity. For example, the operations may allow a wireless device to go to full power on a first cell group based on the presence/absence of transmission activity on a second cell group. As a consequence, system performance may be improved by improving coverage and data rate.

BRIEF DESCRIPTION OF THE DRAWINGS

Examples of embodiments herein are described in more detail with reference to the accompanying drawings, according to the following description.

FIG. 5 is a schematic block diagram illustrating aspects of a method performed by wireless device, according to embodiments herein.

FIG. 7 is a schematic block diagram illustrating a wireless device, according to embodiments herein.

FIG. 8 is a schematic block diagram illustrating embodiments of a first network node, according to embodiments herein.

FIG. 9 is a schematic block diagram illustrating embodiments of a second network node, according to embodiments herein.

FIG. 12 is a flowchart depicting embodiments of a method in a communications system including a host computer, a base station and a user equipment, according to embodiments herein.

FIG. 13 is a flowchart depicting embodiments of a method in a communications system including a host computer, a base station and a user equipment, according to embodiments herein.

DETAILED DESCRIPTION

Figure 1:
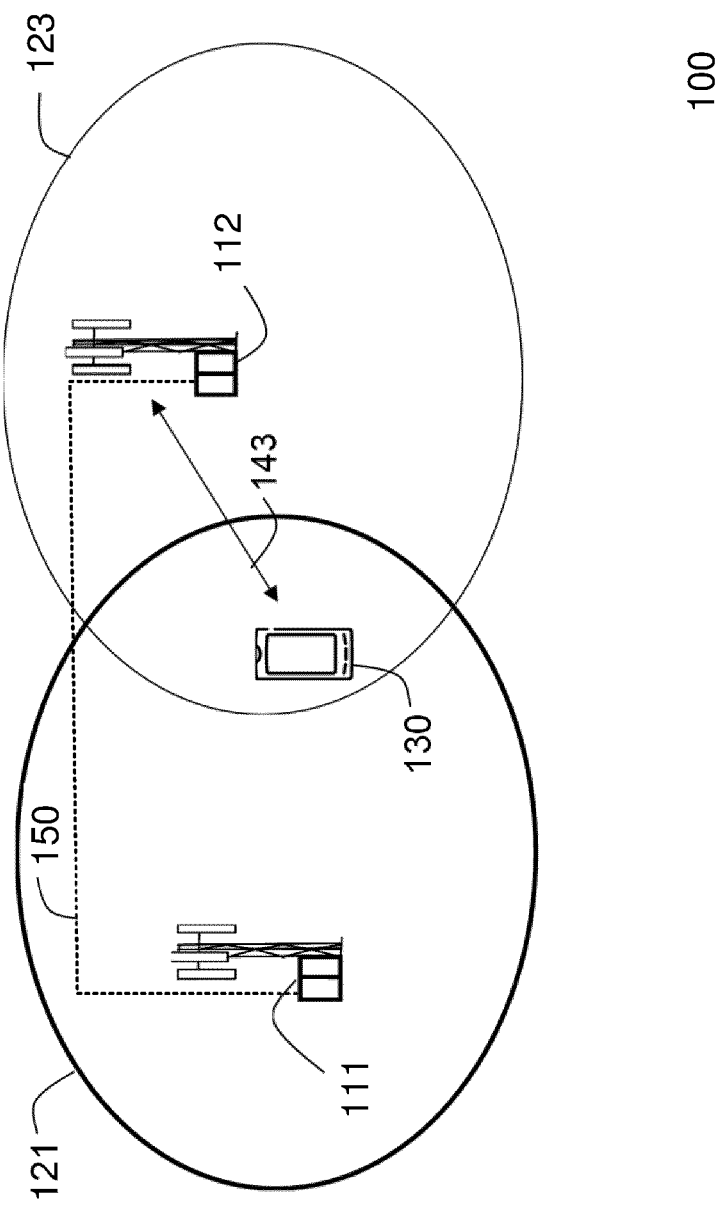
FIG. 1 is a schematic diagram an example of a wireless communications network, according to embodiments herein.

As part of the development of embodiments herein, one or more challenges with the existing technology will first be identified and discussed.

For dual connectivity, the UE may need to perform UL transmissions across both MCG and SCG. Since MCG and SCG may not be co-located or because the implementation may not allow for close coordination of schedulers between the cell groups, the scheduling decisions by the NW for such uplink transmissions may not be fully coordinated, and the UE may need to use power sharing mechanisms to distribute the transmission power across CGs. The simplest power sharing mechanism is one where the UE may use predetermined power limits to transmit on MCG and SCG regardless of transmission activity on the other CG. This is suboptimal, as the predetermined power limits will be smaller than full UL power with which the UE may transmit.

Certain aspects of the present disclosure and their embodiments may provide solutions to these or other challenges. Embodiments herein may be generally understood to address that there may be a need for mechanisms that may allow a UE to go to full power on a CG based on the presence/absence of transmission activity on the other CG. Such mechanisms may improve system performance by improving coverage and data rate. Embodiments herein may be generally understood to relate to power sharing for NR-DC.

Embodiments herein may also be generally understood to provide mechanisms for determining UE transmit power when configured with NR-NR dual connectivity. An approach is described herein where the UE may determine a transmission power for a first uplink transmission on a first cell group by using a power limit. If the UE detects scheduling grants/assignments triggering an overlapping second uplink transmission in a second cell group, the UE may set a lower power limit for the first UL transmission. If such a scheduling grant/assignment is not detected, the UE may set higher power limit, e.g., full power, for the first UL transmission. The UE may also set a lower power limit if determines that there may be a potential overlapping uplink transmission in the second cell group. The same procedure may be followed for the other cell group.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

FIG. 1 depicts a non-limiting example of a wireless network or wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may also support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The wireless communications network 100 comprises a plurality of network nodes, whereof a first network node 111 and a second network node 112 are depicted in the non-limiting example of FIG. 1. In other examples, which are not depicted in FIG. 1, any of the first network node 111 and the second network node 112 may be a distributed node, such as a virtual node in the cloud, and may perform its functions entirely on the cloud, or partially, in collaboration with a radio network node. The expression "a network node 111, 112" may be used herein to refer to any of the first network node 111 and the second network node 112.

Each of the first network node 111 and the second network node 112 may be understood to be a radio network node. That is, a transmission point such as a radio base station, for example a gNB, an eNB, or any other network node with similar features capable of serving a wireless device, such as a user equipment or a machine type communication device, in the wireless communications network 100.

The wireless communications network 100 covers a geographical area which may be divided into cell areas, wherein each cell area may be served by a network node, although, one radio network node may serve one or several cells. The wireless communications network 100 may comprise at least one of: a first group of cells 121 and a second group of cells 123. The first group of cells 121 may be, for example, a MCG. The second group of cells 123 may be, for example, a SCG. The first group of cells 121 may comprise a first cell, and one or more second cells. That is, each of the first group of cells 121 and the second group of cells may comprise one or more cells. In the non-limiting example depicted FIG. 1, only the first cell is depicted to simplify the Figure. The first cell maybe a primary cell (PCell) and each of the one or more second cells may be a secondary cell (SCell). In the non-limiting example depicted in FIG. 1, the first network node 111 is a radio network node that serves the first cell. The first network node 111 may, in some examples, serve receiving nodes, such as wireless devices, with serving beams.

The second group of cells 123 may comprise a third cell, and one or more fourth cells. In the non-limiting examples depicted in FIG. 1, only the third cell is depicted to simplify the Figure. The third cell maybe a primary secondary cell (PSCell) and each of the one or more fourth cells may be a secondary cell (SCell). In the non-limiting example depicted in FIG. 1, the second network node 112 is a radio network node that serves the third cell. The second network node 112 may serve receiving nodes, such as wireless devices, with serving beams.

The first network node 111, in some examples, may be a MN.

The second network node 112, in some examples, may be a SN.

In some examples, both of the first network node 111 and the second network node 112 may each be a gNB.

In LTE, any of the first network node 111 and the second network node 112 may be referred to as an eNB. In some examples, the first network node 111 may be an eNB as MN, and the second network node 112 may be a gNB as SN. It may be noted that although the description of embodiments herein may focus on the LTE-NR tight interworking case, where the LTE is the master node, embodiments herein may be understood to also be applicable to other DC cases, such as LTE-NR DC, where NR is the master and LTE is the secondary node (NE-DC), NR-NR DC, where both the master and secondary nodes are NR nodes, or even between LTE/NR and other RATs. In some examples, the first network node 111 may be a gNB as MN, and the second network node 112 may be an eNB as SN.

Any of the first network node 111 and the second network node 112 may be of different classes, such as, e.g., macro base station, home base station or pico base station, based on transmission power and thereby also cell size. Any of the first network node 111 and the second network node 112 may support one or several communication technologies, and its name may depend on the technology and terminology used. In 5G/NR, any of the first network node 111 and the second network node 112 may be referred to as a gNB and may be directly connected to one or more core networks, which are not depicted in FIG. 1.

A plurality of wireless devices are located in the wireless communication network 100, whereof a wireless device 130, is depicted in the non-limiting example of FIG. 1. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the user equipments comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the first network node 111 in the first cell over a first link 141, e.g., a radio link. The wireless device 130 may be configured to communicate within the wireless communications network 100 with the first network node 111 in each of the one or more second cells over a respective second link, e.g., a radio link. The wireless device 130 may be configured to communicate within the wireless communications network 100 with the second network node 112 in the third cell over a third link 143, e.g., a radio link. The wireless device 130 may be configured to communicate within the wireless communications network 100 with the second network node 112 in each of the one or more fourth cells 124 over a respective fourth link, e.g., a radio link.

The first network node 111 and the second network node 112 may be configured to communicate within the wireless communications network 100 over a fifth link 150, e.g., a wired link or an X2 interface.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second" and/or "fourth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a network node, such as the second network node 112 or the first network node 111, e.g., a gNB, and embodiments related to a wireless device, such as the wireless device 130, e.g., a 5G UE.

It is an object of embodiments herein to improve the handling of power of transmission by a wireless device in a wireless communications network. It is a particular object of embodiments herein to improve the handling of power of transmission by a wireless device in dual connectivity.

The wireless device 130 embodiments relate to FIG. 2, FIG. 5, FIG. 6 and FIGS. 10-15.

A method, performed by a wireless device such as the wireless device 130, is described herein. The method may be understood to be for handling a power of transmission. The wireless device 130 may be configured with dual connectivity to be enabled to transmit using the first group of cells 121 and the second group of cells 123. The wireless device 130, the first group of cells 121 and the second group of cells 123 may be operating in the wireless communications network 100.

The method may comprise one or more of the following actions.

Figure 2:
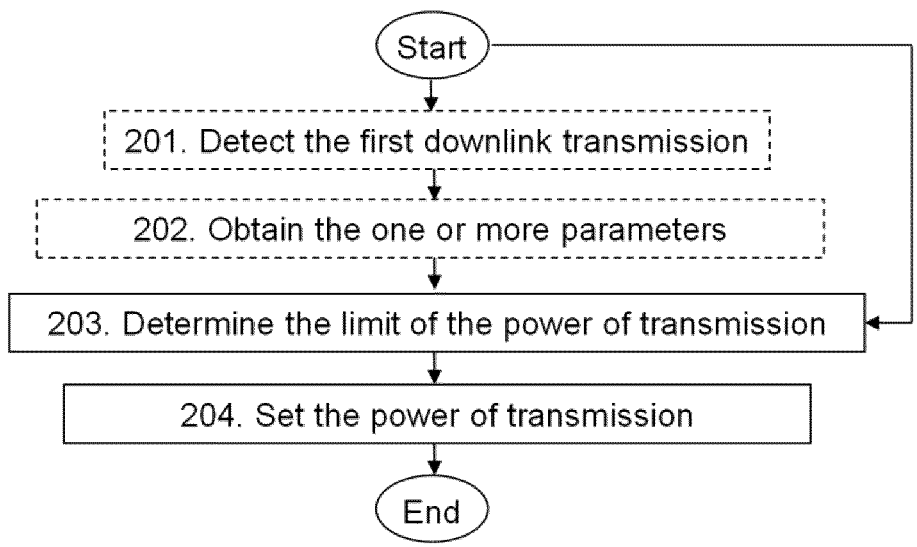
FIG. 2 is a flowchart depicting a method in a wireless device, according to embodiments herein.

In some embodiments all the actions may be performed. One or more embodiments may be combined, where applicable. All possible combinations are not described to simplify the description. A non-limiting example of the method performed by the wireless device 130 is depicted in FIG. 2. Some actions may be performed in a different order than that shown in FIG. 2.

Determining 203 a limit of a power of transmission of a first uplink transmission in the first group of cells 121 will now be described. The determining 203 may be based on:
 i. whether or not a second uplink transmission in the second group of cells 123 that overlaps in time with the first uplink transmission is predicted/expected/present/ determined to take place, e.g., whether or not the second uplink transmission is predicted to overlap in time with the first uplink transmission, and
 ii. whether or not an uplink transmission opportunity in the second group of cells 123 that overlaps in time with the first uplink transmission is predicted/expected/present/determined to take place, e.g., whether or not the uplink transmission opportunity is predicted to overlap in time with the first uplink transmission. The wireless device 130 may be configured to perform this receiving action 203, e.g., by means of a determining unit 701 within the wireless device 130, configured to perform this action. The determining unit 701 may be the processor 706 of the wireless device 130, or an application running on such processor.

In some examples, the wireless device 130 may determine, e.g., as part of the determining 203, the power of transmission of the first uplink transmission.

In some embodiments, the determining 203 may be further based on at least one of:
 a. a detection, by the wireless device 130 of a downlink transmission set to trigger the second uplink transmission;
 b. selecting between a first limit of the power of transmission and a second limit of the power of transmission,
 c. an offset in relation to a beginning of a time of transmission of the first uplink transmission,
 d. one or more parameters, e.g., a first set of parameters, of the second group of cells 123, and
 e. a priority rule.

In some examples, the wireless device 130 may determine whether or not the second uplink transmission is present based on detecting a PDCCH that triggers the second uplink transmission.

In some examples, the wireless device 130 may determine whether or not the uplink transmission opportunity is present based on one or more higher layer configured parameters.

In some examples, the higher layer configured parameters may include one or more of:
 (a) a search space configuration based on which PDCCH monitoring occasions may be determined for a serving cell/bandwidth part (BWP) in the second group of cells 123.
 (b) a configuration related to possible K1 values i.e., offset between PDSCH and corresponding HARQ-ACK on PUSCH/PUCCH PUSCH/PUCCH transmission on serving cell/BWP in second cell group
 (c) a configuration related to possible K2 values i.e., offset between PDCCH and corresponding PUSCH for PUSCH transmissions on a serving cell/BWP in second cell group.

Setting 204 the power of transmission to transmit the first uplink transmission, based on the determined limit will now be described. The wireless device 130 may be configured to perform this setting action 204, e.g., by means of a setting unit 702 within the wireless device 130, configured to perform this action. The setting unit 702 may be the processor 706 of the wireless device 130, or an application running on such processor.

In some embodiments, the method may further comprise the following action:

Obtaining 202, e.g., from a network node 111, 112 serving the wireless device 130 the one or more parameters will now be described. The wireless device 130 may be configured to perform this obtaining action 202, e.g., by means of an obtaining unit 703 within the wireless device 130, configured to perform this action. The obtaining unit 703 may be a processor 706 of the wireless device 130, or an application running on such processor.

The obtaining in this Action 202 may be performed via the first link 141, or the second link 142.

In some embodiments, the determining 201 may be further based on a prediction, based on one or more parameters, of a downlink transmission set to trigger the second uplink transmission.

Other units 705 may be comprised in the wireless device 130.

Detecting 201 a first downlink transmission set to trigger the second uplink transmission, in a time period preceding a beginning of the transmission of the first uplink transmission, and wherein the determining 203 is further based on the detecting 201 of the first downlink transmission will now be described. The wireless device 130 may be configured to perform this detecting action 201, e.g., by means of a detecting unit 704 within the wireless device 130, configured to perform this action. The detecting unit 704 may be a processor 706 of the wireless device 130, or an application running on such processor.

The determining 203 may comprise ensuring that a combined power of transmission across the first group of cells 121 and the second group of cells 123 does not exceed a threshold, e.g., a limit of the power or power limit.

The wireless device 130 may also be configured to communicate user data with a host application unit in a host computer 1110, e.g., via another link such as 1150.

In FIG. 7, optional units are indicated with dashed boxes.

The wireless device 130 may comprise an interface unit to facilitate communications between the wireless device 130 and other nodes or devices, e.g., the network node 111, 112, the host computer 1110, or any of the other nodes. In some particular examples, the interface may, for example, include a transceiver configured to transmit and receive radio signals over an air interface in accordance with a suitable standard.

Figure 11:
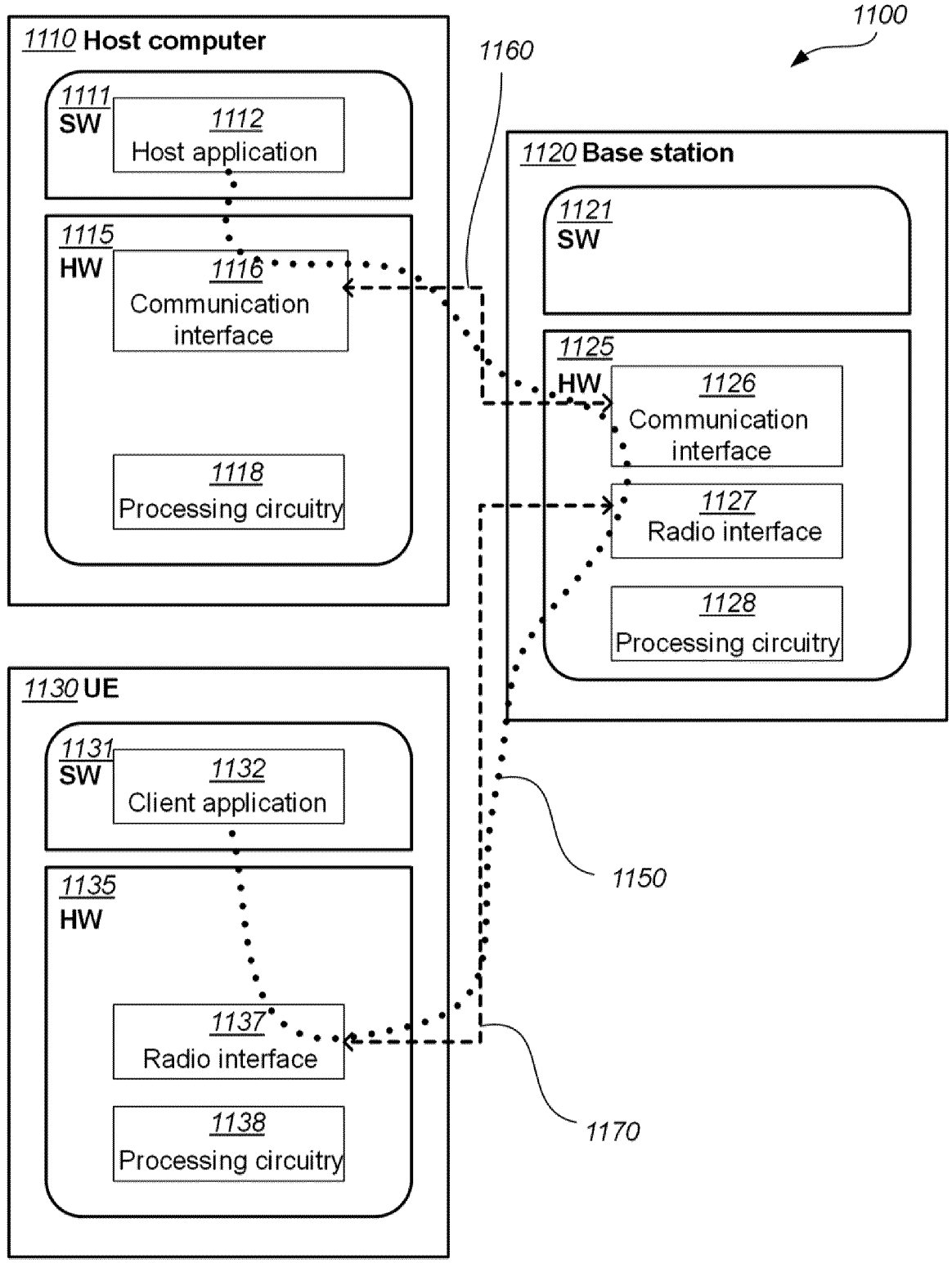
FIG. 11 is a generalized block diagram of a host computer communicating via a base station with a user equipment over a partially wireless connection, according to embodiments herein.

The wireless device 130 may comprise an arrangement as shown in FIG. 7 or in FIG. 11.

By the wireless device 130 determining 203 the limit of the power of transmission of the first uplink transmission in the first group of cells 121 and setting the power of transmission based on the determined limit, the wireless device 130 is enabled to transmit at higher power, e.g., full power, if it determines that there are no scheduling grants/assignments or potential scheduling grants/assignments triggering an overlapping transmission. This may be understood to improve system performance. Moreover, a simpler implementation in the wireless device 130 is enabled, where hardware/software in the wireless device 130 may set transmission power of a the first group of cells 121 without an exact computation of transmission power of overlapping transmissions on the second group of cells 123.

The first network node 111 embodiments relate to FIG. 3, and FIGS. 10-15.

A method, performed by a first network node, such as the first network node 111 is described herein. The method may be understood to be handling a power of transmission of the wireless device 130. The wireless device 130 may be served by the first network node 111 using the first group of cells 121. The first network node 111, and the wireless device 130 may be operating in the wireless communications network 100.

The first network node 111 may serve the wireless device 130 using the first group of cells 121 in a dual connectivity configuration comprising the second group of cells 123.

The method may comprise one or more of the following actions.

Figure 3:
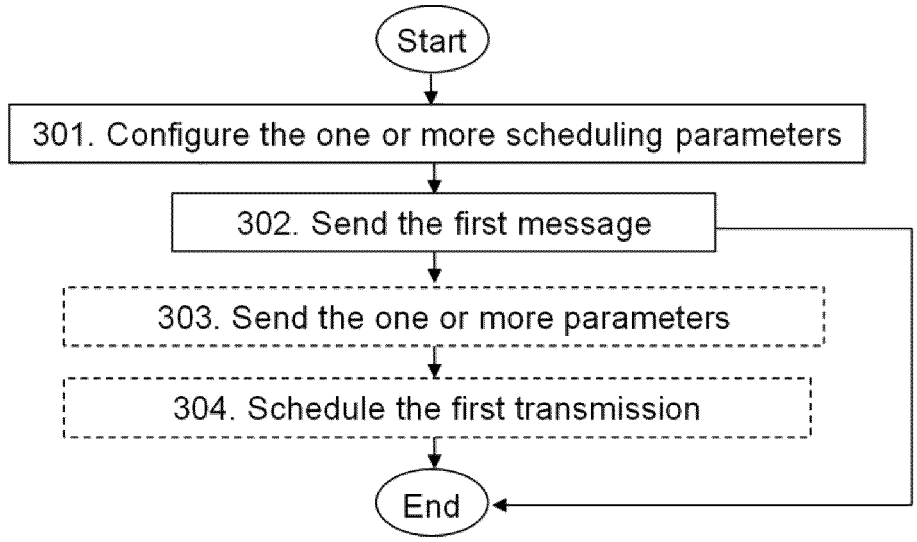
FIG. 3 is a flowchart depicting a method in a first network node, according to embodiments herein.

In some embodiments, all the actions may be performed. One or more embodiments may be combined, where applicable. All possible combinations are not described to simplify the description. A non-limiting example of the method performed by the first network node 111 is depicted in FIG. 3. Some actions may be performed in a different order than that shown in FIG. 3.

Configuring 301 one or more scheduling parameters for one or more transmissions by a wireless device 130 will now be described. The configuring may be such that a delay between a downlink message and a corresponding uplink transmission is greater than a value. The first network node 111 may be configured to perform this configuring action 301, e.g. by means of a configuring unit 801 within the first network node 111, configured to perform this action. The configuring unit 801 may be a processor 804 of the first network node 111, or an application running on such processor.

Sending 302 a first message to the second base network node 112, the first message comprising an indication of the configured one or more scheduling parameters will now be described. The first network node 111 may be configured to perform this sending action 302, e.g. by means of a sending unit 802, configured to perform this action. The sending unit 802 may be a processor 804 of the first network node 111, or an application running on such processor.

Sending may be performed, e.g., via the first link 141.

In some embodiments, the method may further comprise one or more of the following actions:

Scheduling 304 a first transmission of the one or more transmissions based on the configured one or more scheduling parameters will now be described. The first network node 111 may be configured to perform this scheduling action 304, e.g., by means of a scheduling unit 803 within the first network node 111, configured to perform this action. The scheduling unit 803 may be the processor 804 of the first network node 111, or an application running on such processor.

In some embodiments wherein the first network node 111 may serve the wireless device 130 using the first group of cells 121 in the dual connectivity configuration comprising the second group of cells 123, the method may further comprise:

Sending 303 one or more parameters, e.g., a first indication of the one or more parameters, to the wireless device 130, the one or more parameters being of the second group of cells 123 will now be described. The first network node 111 may be configured to perform this sending action 303, e.g., by means of the sending unit 802 within the first network node 111, configured to perform this action.

Sending may be performed, e.g., via the first link 141.

Other units 811 may be comprised in the first network node 111.

The first network node 111 may also be configured to communicate user data with a host application unit in a host computer 1110, e.g., via another link such as 1150.

In FIG. 8, optional units are indicated with dashed boxes.

The first network node 111 may comprise an interface unit to facilitate communications between the first network node 111 and other nodes or devices, e.g., the another first network node 111, the wireless device 130, the host computer 1110, or any of the other nodes. In some particular examples, the interface may, for example, include a transceiver configured to transmit and receive radio signals over an air interface in accordance with a suitable standard.

The first network node 111 may comprise an arrangement as shown in FIG. 8 or in FIG. 11.

Some embodiments herein will now be further described with some non-limiting examples.

In the following description, any reference to a/the UE, or simply "UE" may be understood to equally refer the wireless device 130; any reference to a/the gNBs may be understood to equally refer to the first network node 111, and/or the second network node 112; any reference to a/the first cell group or a/the a first cell group CG1 may be understood to equally refer the first group of cells 121; any reference to a/the second cell group or a/the a first cell group CG2 may be understood to equally refer the second group of cells 123.

The second network node 112 embodiments relate to FIG. 4, and FIGS. 10-15.

A method, performed by a second network node, such as the second network node 112 is described herein. The method may be understood to be handling a power of transmission of the wireless device 130. The wireless device 130 may be served by the second network node 112 using the second group of cells 123. The second network node 112, and the wireless device 130 may be operating in the wireless communications network 100.

The second network node 112 may serve the wireless device 130 using the second group of cells 123 in the dual connectivity configuration comprising the first group of cells 121.

The method may comprise one or more of the following actions.

Figure 4:
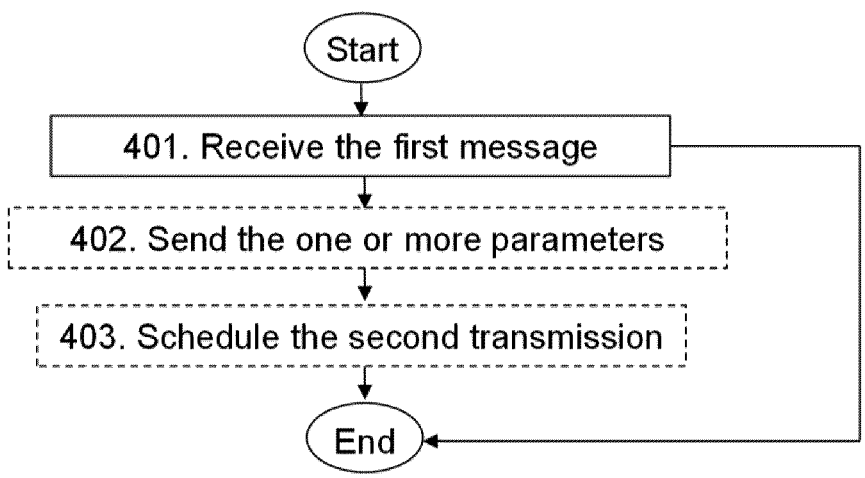
FIG. 4 is a flowchart depicting a method in a second network node, according to embodiments herein.
Figure 6:
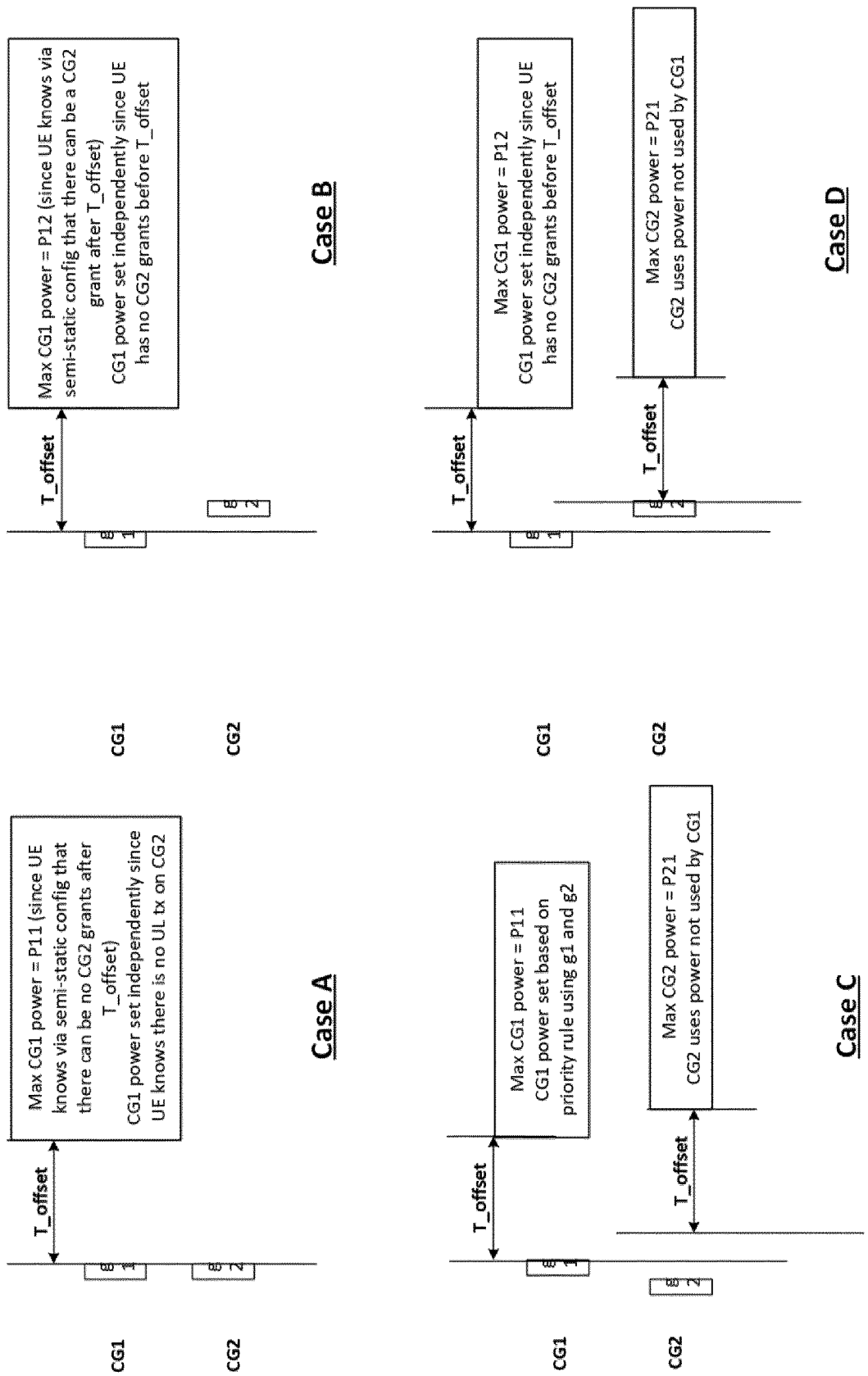
FIG. 6 is a schematic block diagram illustrating aspects of a method performed by wireless device, according to embodiments herein.

In some embodiments, all the actions may be performed. One or more embodiments may be combined, where applicable. All possible combinations are not described to simplify the description. A non-limiting example of the method performed by the second network node 112 is depicted in FIG. 4. Some actions may be performed in a different order than that shown in FIG. 4.

Receiving 401 the first message from the first network node 111 will now be described. The first message may comprise the indication of the one or more scheduling parameters configured by the first network node 111. The configured one or more scheduling parameters may be for one or more transmissions by the wireless device 130. The configured one or more parameters may be such that the delay between the downlink message and the corresponding uplink transmission is greater than the value. The second network node 112 may be configured to perform this receiving action 401, e.g. by means of a receiving unit 901 within the second network node 112, configured to perform this action. The receiving unit 901 may be a processor 903 of the second network node 112, or an application running on such processor.

In some embodiments wherein the second network node 112 may serve the wireless device 130 using the second group of cells 123 in the dual connectivity configuration comprising the first group of cells 121, the method may further comprise:

Sending 402 one or more parameters, e.g., a second indication of the one or more parameters, to the wireless device 130. The one or more parameters may be of the second group of cells 123. The second network node 112 may be configured to perform this sending action 402, e.g. by means of a sending unit 902, configured to perform this action. The sending unit 902 may be a processor 903 of the second network node 112, or an application running on such processor.

Sending may be performed, e.g., via the second link 142.

In some embodiments, the method may further comprise one or more of the following actions:

Scheduling 403 a second transmission of the one or more transmissions based on the configured one or more scheduling parameters. The second network node 112 may be configured to perform this scheduling action 403, e.g., by means of a scheduling unit 910 within the second network node 112, configured to perform this action. The scheduling unit 910 may be the processor 903 of the second network node 112, or an application running on such processor.

Other units 911 may be comprised in the second network node 112.

The second network node 112 may also be configured to communicate user data with a host application unit in a host computer 1110, e.g., via another link such as 1150.

In FIG. 9, optional units are indicated with dashed boxes.

The second network node 112 may comprise an interface unit to facilitate communications between the second network node 112 and other nodes or devices, e.g., the first network node 111, the wireless device 130, the host computer 1110, or any of the other nodes. In some particular examples, the interface may, for example, include a transceiver configured to transmit and receive radio signals over an air interface in accordance with a suitable standard.

The second network node 112 may comprise an arrangement as shown in FIG. 9 or in FIG. 11.

Some embodiments herein will now be further described with some non-limiting examples.

In the following description, any reference to a/the UE, or simply "UE" may be understood to equally refer the wireless device 130; any reference to a/the gNBs may be understood to equally refer to the first network node 111, and/or the second network node 112; any reference to a/the first cell group or a/the a first cell group CG1 may be understood to equally refer the first cell group 121; any reference to a/the second cell group or a/the a first cell group CG2 may be understood to equally refer the second cell group 123.

A first group of examples will now be described.

In a first group of examples, a UE may be configured with at least two cell groups. For example, a first cell group CG1 and a second cell group CG2. Each cell group may comprise one or more serving cells. The UE may be scheduled to make a first uplink transmission, e.g., PUSCH, PUCCH, SRS, PRACH, for a serving cell in CG1. The UE may use a power limit to determine the transmission power for the first uplink transmission. The power limit may be determined using a time offset (T_offset) from the beginning of the first uplink transmission, a first set of parameters corresponding to CG2, and whether there are any DL grants/assignments detected before (or received before) T_offset that may trigger an uplink transmission in CG2 that may overlap with the first uplink transmission.

If the first uplink transmission starts from time T0, the UE may use a first power limit (P11) to determine the transmission power for the first uplink transmission, if a) the UE detects a DL grant/assignment before T0-T_offset which triggers an uplink transmission in CG2 that overlaps with the first uplink transmission (condition A), or b) the UE determines from the first set of parameters that there may be a DL grant/assignment after T0-T_offset which may potentially trigger an uplink transmission in CG2 that overlaps with the first uplink transmission, or a periodic/semi-persistent uplink transmission in CG2, that overlaps with the first uplink transmission (condition B)

otherwise, the UE may use a second power limit (P12) to determine the transmission power for the first uplink transmission.

The first set of parameters may include one or more of:
ATDD UL/DL configuration indicated for transmission/reception on a serving cell/BWP in CG2;
A search space configuration or a CORESET configuration based on which PDCCH monitoring occasions may be determined for a serving cell/BWP in CG2;
A configuration related to transmission of configured UL grants for serving cell/BWP in CG2;
Configuration related to possible K1 values, i.e., offset between PDSCH and corresponding HARQ-ACK on PUSCH/PUCCH, for PUSCH/PUCCH transmission on serving cell/BWP in CG2;

Configuration related to possible K2 values, i.e., offset between PDCCH and corresponding PUSCH, for PUSCH transmissions on a serving cell/BWP in CG2;

Configuration related to possible K0 values, i.e., offset between PDCCH and corresponding PDSCH, and TDRA for PDSCH reception on a serving cell/BWP in CG2;

A slot format indicator for a serving cell/BWP in CG2.

The first set of parameters may be determined based on semi-static signalling, i.e., RRC signaling. The power limits for CG2 may be determined using the same procedure as above.

The first power limit (P11) may be lower than the second power limit (P12). In one example, the UE may be configured with both first and second power limits via RRC for each CG, i.e., P11 and P12 for CG1 and P21, P22, where P21 may be the lower power limit, for CG2. In another example, the first power limit may be RRC configured, while the second power limit may be determined from UE power class, Pcmax, etc. e.g., P11 and P21 may be RRC configured, and P12 and P22 may be determined from UE power class, Pcmax, etc.

The UE may use different T_offset based on whether it may be operating in a synchronous NR-DC or an asynchronous NR-DC scenario. T_offset may be configured by higher layers. T_offset may be based on UE capability signaling.

FIG. 4 illustrates the above aspects.

The gNBs serving CG1 and CG2 may avoid condition B described above by configuring their scheduling parameters, e.g., allowable k0, k1, k2, to a restricted set of values. For example, the gNBs may configure the scheduling parameters such that that the delay between a DL grant/assignment(s) and the corresponding UL transmission(s) may be always greater than a given value X such as X=T_offset+maximum possible time difference between CG1 and CG2 (Td). With such a configuration, UE may not have to check for condition B to set its power limit to P12. Td may be for example ~35 us for synchronous NR-DC and ~500 us for asynchronous NR-DC. The gNBs may use inter-gNB signaling to coordinate on the value of X to use. The MCG may determine the value of X and indicate it to the SCG.

Typically, there may be a maximum power limit (P_tot_limit) that may apply to combined UE transmission power across transmissions on CG1 and CG2. The UE may need to ensure that combined UE transmission power across transmissions on CG1 and CG2 does not exceed P_tot_limit. If P11 and P21 are configured such that P11+P21<=P_tot_limit, and the UE sets the per CG power limits using the procedures described above, the UE may set the transmission power for a transmission on CG1 without computing the actual transmission power of an overlapping transmission on CG2. This reduces UE implementation complexity.

In some embodiments related to the first group of examples, if the UE is configured with power limits P11 and P21, e.g., CG1 is MCG and CG2 is SCG, such that P11+P21>P_tot_limit, and if the UE scheduled with first UL transmission with transmission power pwr1 on CG1 and second UL transmission with transmission power pwr2 on CG2 such that pwr1+pwr2>P_tot_limit, the UE may scale down transmission power for second UL transmission, i.e., the SCG transmission, such that total UE transmission power across CG1 and CG2 does not exceed P_tot_limit.

A second group of examples will now be described.

In a second group of examples, a UE may be configured with at least two cell groups. For example, a first cell group CG1 and a second cell group CG2. Each cell group may comprise one or more serving cells. The UE may be scheduled to make a first uplink transmission, e.g., PUSCH, PUCCH, SRS, PRACH, for a serving cell in CG1. The UE may use a power limit to determine the transmission power for the first uplink transmission. The power limit may be determined using a time offset (T_offset) from the beginning of the first uplink transmission, and a first set of parameters corresponding to CG2.

The UE may use a first power limit to determine the transmission power for the first uplink transmission, if it determines from the first set of parameters that an overlapping UL transmission on CG2, i.e., overlapping with the first uplink transmission on CG1, may be triggered by PDCCH(s) received within time T_offset from the beginning of the first uplink transmission. The UE may use a second power limit to determine the transmission power for the first uplink transmission, if it determines from the first set of parameters that an overlapping UL transmission on CG2, i.e., overlapping with the first uplink transmission on CG1, may only be triggered by PDCCH(s) received before time T_offset from the beginning of the first uplink transmission.

The first set of parameters may include:
ATDD UL/DL configuration indicated for transmission/reception on a serving cell/BWP in CG2;
A search space configuration or a CORESET configuration based on which PDCCH monitoring occasions may be determined for a serving cell/BWP in CG2;
A configuration related to transmission of configured UL grants for serving cell/BWP in CG2;
Configuration related to possible K1 values, i.e., offset between PDSCH and corresponding HARQ-ACK on PUSCH/PUCCH, PUSCH/PUCCH transmission on serving cell/BWP in CG2;
Configuration related to possible K2 values, i.e., offset between PDCCH and corresponding PUSCH, for PUSCH transmissions on a serving cell/BWP in CG2;
Configuration related to possible K0 values, i.e., offset between PDCCH and corresponding PDSCH, and TDRA for PDSCH reception on a serving cell/BWP in CG2;
A slot format indicator for a serving cell/BWP in CG2.

The first set of parameters may be determined based on semi-static signalling, i.e., RRC signaling.

The first power limit may be lower than the second power limit. In one example, UE may be configured with both first and second power limits via RRC. In another example, the first power limit may be RRC configured while second power limit may be determined from UE power class, Pcmax, etc.

In order to determine the transmission power of the first UL transmission, the UE may use the information in the decoded PDCCH(s), e.g., UL grants or DL assignments with DCI formats 0-0, 0-1, 1-0, 1-1, that trigger an overlapping UL transmission on CG2 with the first UL transmission, if the PDCCHs are received before T_offset from the beginning of the first UL transmission.

If the UE determines that there is e.g., a second UL transmission on CG2 that overlaps with the first UL transmission, in order to determine the transmission power of the first UL transmissions, the UE may use a priority rule based on comparing the signal/channel type and payload of the first and second transmissions. One example of a priority rule is PRACH of PCell>PUCCH/PUSCH with ACK/NACK and/or SR>PUCCH/PUSCH with other UCIs>PUSCH w/o UCI>SRS/PRACH of Scell. Another example is that MCG transmissions may be prioritized over SCG.

Based on such priority rules, if the UE determines that first UL transmission has higher priority, it may transmit the first UL transmission based on corresponding power control settings and based on the first or second power limit as described above. Alternately, if the UE determines that first UL transmission has lower priority, it may scale down the power of the first UL transmission by accounting for power required for higher priority transmissions in other CG, i.e., second UL transmission in this example.

In some embodiments, the UE may use an order for computing the transmission power of transmissions in different CGs. For example, the UE may first compute the transmission power of transmissions on MCG, e.g., based on one of priority rules above, and then transmission power of transmissions on SCG may be computed by taking into account the power used for MCG transmission(s). Here, MCG is master cell group and SCG is secondary cell group.

In other embodiments, the UE may first compute the transmission power of the CG for which the transmission occurs earlier and then compute the transmission power of the other CG.

The UE may use different T_offset based on whether it is operating in synchronous NR-DC or asynchronous NR-DC scenario. T_offset may be configured by higher layers.

FIG. 5 shows an example.

As shown in FIG. 5, for an UL transmission on CG1, triggered by a DL PDCCH g1, if the UE determines that all possible PDCCH monitoring occasions on CG2, that may trigger an overlapping UL transmission on CG2 with the CG1 UL transmission, occur before time T_offset, the UE may set power limit for CG1 UL transmission to P11, i.e., CaseA in the figure. If the UE determines that PDCCH monitoring occasions may occur within time T_offset, the UE may set the power limit for CG1 UL transmission to P12, i.e., Case B in the figure. For both Case A and case B, UE does not detect any PDCCH(s) scheduling overlapping UL transmission on CG2. For Case C, there is an overlapping UL transmission on CG2 which is triggered by a PDCCH (g2) received earlier than T_offset from the beginning of CG1 UL transmission. For this case, the UE may first compute the transmission power of CG with earlier starting UL transmission, in this case CG1, and then may compute the transmission power of CG with later transmission, i.e., CG2 in Case C. For Case D, there is an overlapping UL transmission on CG2 which may be triggered by a PDCCH (g2) received later than T_offset from the beginning of CG1 UL transmission. For this case, the UE may first compute the transmission power similar to Case B for CG1 power, while CG2 power limit is given by P21, and CG2 may use any power not used by CG1.

As summarized overview of the above, embodiments herein may be understood to relate to a UE configured with dual connectivity determining the transmission power of a transmission in a first cell group using a power limit, where the power limit may be determined using condition A and B described below.

If the first uplink transmission starts from time T0, the UE may use a first power limit (P11) to determine the transmission power for the first uplink transmission, if
   b. the UE detects a DL grant/assignment before T0-T_offset which triggers an uplink transmission in CG2 that overlaps with the first uplink transmission (condition A), or
   c. the UE determines from the first set of parameters that there may be a DL grant/assignment received after T0-T_offset which may potentially trigger an uplink transmission in CG2 that overlaps with the first uplink transmission (condition B); otherwise, i.e., condition A and B do not apply, the UE may use a second power limit (P12) to determine the transmission power of for the second uplink transmission.

The first power limit may be lower than second power limit.

Certain embodiments disclosed herein may provide one or more of the following technical advantage(s), which may be summarized as follows. Embodiments herein may be understood to allow the UE to transmit at higher power, e.g., full power, if it determines that there are no scheduling grants/assignments or potential scheduling grants/assignments triggering an overlapping transmission. This may be understood to improve system performance. Embodiments herein may be understood to also allow a simpler UE implementation where UE hardware/software may set transmission power of a first CG without an exact computation of transmission power of overlapping transmissions on a second CG.

FIG. 7 depicts two different examples in panels a) and b), respectively, of the arrangement that the wireless device 130 may comprise to perform the method actions described above in relation to FIG. 2. In some embodiments, the wireless device 130 may comprise the following arrangement depicted in FIG. 7a.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130, and will thus not be repeated here.

In FIG. 7, optional modules are indicated with dashed boxes.

The embodiments herein in the wireless device 130 may be implemented through one or more processors, such as a processor 706 in the wireless device 130 depicted in FIG. 7a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 707 comprising one or more memory units. The memory 707 is arranged to be used to store obtained information, store data, configurations, schedulings, and applications etc. to perform the methods herein when being executed in the wireless device 130.

In some embodiments, the wireless device 130 may receive information from, e.g., the first network node 111 and/or the second network node 112, through a receiving port 708. In some embodiments, the receiving port 708 may be, for example, connected to one or more antennas in wireless device 130. In other embodiments, the wireless device 130 may receive information from another structure in the wireless communications network 100 through the receiving port 708. Since the receiving port 708 may be in communication with the processor 706, the receiving port 708 may then send the received information to the processor 706. The receiving port 708 may also be configured to receive other information.

The processor 706 in the wireless device 130 may be further configured to transmit or send information to e.g., the first network node 111 and/or the second network node 112 or another structure in the wireless communications network 100, through a sending port 709, which may be in communication with the processor 706, and the memory 707.

Those skilled in the art will also appreciate that the determining unit 701, the setting unit 702, the obtaining unit 703, the detecting unit 704 and the other units 705 described above may refer to a combination of analog and digital modules, and/or one or more processors configured with software and/or firmware, e.g., stored in memory, that, when executed by the one or more processors such as the processor 706, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 701-705 described above may be implemented as one or more applications running on one or more processors such as the processor 706.

Thus, the methods according to the embodiments described herein for the wireless device 130 may be respectively implemented by means of a computer program 710 product, comprising instructions, i.e., software code portions, which, when executed on at least one processor 706, cause the at least one processor 706 to carry out the actions described herein, as performed by the wireless device 130. The computer program 710 product may be stored on a computer-readable storage medium 711. The computer-readable storage medium 711, having stored thereon the computer program 710, may comprise instructions which, when executed on at least one processor 706, cause the at least one processor 706 to carry out the actions described herein, as performed by the wireless device 130. In some embodiments, the computer-readable storage medium 711 may be a non-transitory computer-readable storage medium, such as a CD ROM disc, or a memory stick. In other embodiments, the computer program 710 product may be stored on a carrier containing the computer program 710 just described, wherein the carrier is one of an electronic signal, optical signal, radio signal, or the computer-readable storage medium 711, as described above.

The wireless device 130 may comprise a communication interface configured to facilitate communications between the wireless device 130 and other nodes or devices, e.g., the first network node 111 or the second network node 112. The interface may, for example, include a transceiver configured to transmit and receive radio signals over an air interface in accordance with a suitable standard.

In other embodiments, the wireless device 130 may comprise the following arrangement depicted in FIG. 7b. The wireless device 130 may comprise a processing circuitry 706, e.g., one or more processors such as the processor 706, in the wireless device 130 and the memory 707. The wireless device 130 may also comprise a radio circuitry 712, which may comprise e.g., the receiving port 708 and the sending port 709. The processing circuitry 706 may be configured to, or operable to, perform the method actions according to FIG. 2, in a similar manner as that described in relation to FIG. 7a. The radio circuitry 712 may be configured to set up and maintain at least a wireless connection with the first network node 111 and/or the second network node 112. Circuitry may be understood herein as a hardware component.

Hence, embodiments herein also relate to the wireless device 130 operative to handle a power of transmission, the wireless device 130 being operative to operate in the wireless communications network 100. The wireless device 130 may comprise the processing circuitry 706 and the memory 707, said memory 707 containing instructions executable by said processing circuitry 706, whereby the wireless device 130 is further operative to perform the actions described herein in relation to the wireless device 130, e.g., in FIG. 2.

FIG. 8 depicts two different examples in panels a) and b), respectively, of the arrangement that the first network node 111 may comprise to perform the method actions described above in relation to FIG. 3. In some embodiments, the first network node 111 may comprise the following arrangement depicted in FIG. 8a.

The embodiments herein in the first network node 111 may be implemented through one or more processors, such as a processor 804 in the first network node 111 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 805 comprising one or more memory units. The memory 805 is arranged to be used to store obtained information, store data, configurations, schedulings, and applications etc. to perform the methods herein when being executed in the first network node 111.

In some embodiments, the first network node 111 may receive information from, e.g., the second network node 112 and/or the wireless device 130, through a receiving port 806. In some embodiments, the receiving port 806 may be, for example, connected to one or more antennas in first network node 111. In other embodiments, the first network node 111 may receive information from another structure in the wireless communications network 100 through the receiving port 806. Since the receiving port 806 may be in communication with the processor 804, the receiving port 806 may then send the received information to the processor 804. The receiving port 806 may also be configured to receive other information.

The processor 804 in the first network node 111 may be further configured to transmit or send information to e.g., the second network node 112 and/or the wireless device 130, or another structure in the wireless communications network 100, through a sending port 807, which may be in communication with the processor 804, and the memory 805.

Those skilled in the art will also appreciate that the configuring unit 801, the sending unit 802, the scheduling unit 803 and the other units 811 described above may refer to a combination of analog and digital modules, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 801-803 and 811 described above may be implemented as one or more applications running on one or more processors such as the processor 804.

Thus, the methods according to the embodiments described herein for the first network node 111 may be respectively implemented by means of a computer program 808 product, comprising instructions, i.e., software code portions, which, when executed on at least one processor 804, cause the at least one processor 804 to carry out the actions described herein, as performed by the first network node 111. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the first network node 111. In some embodiments, the computer-readable storage medium 809 may be a non-transitory computer-readable storage medium, such as a CD ROM disc, or a memory stick. In other embodiments, the computer program 808 product may be stored on a carrier containing the computer program 808 just described, wherein the carrier is one of an electronic signal, optical signal, radio signal, or the computer-readable storage medium 809, as described above.

The first network node 111 may comprise a communication interface configured to facilitate communications between the first network node 111 and other nodes or devices, e.g., the second network node 112 and/or the wireless device 130. The interface may, for example, include a transceiver configured to transmit and receive radio signals over an air interface in accordance with a suitable standard.

In other embodiments, the first network node 111 may comprise the following arrangement depicted in FIG. 8b. The first network node 111 may comprise a processing circuitry 804, e.g., one or more processors such as the processor 804, in the first network node 111 and the memory 805. The first network node 111 may also comprise a radio circuitry 810, which may comprise e.g., the receiving port 806 and the sending port 807. The processing circuitry 810 may be configured to, or operable to, perform the method actions according to FIG. 3, in a similar manner as that described in relation to FIG. 8a. The radio circuitry 810 may be configured to set up and maintain at least a wireless connection with the second network node 112 and/or the wireless device 130. Circuitry may be understood herein as a hardware component.

Hence, embodiments herein also relate to the first network node 111 comprising the processing circuitry 804 and the memory 805, said memory 805 containing instructions executable by said processing circuitry 804, whereby the first network node 111 is operative to perform the actions described herein in relation to the first network node 111, e.g., in FIG. 3.

FIG. 9 depicts two different examples in panels a) and b), respectively, of the arrangement that the second network node 112 may comprise to perform the method actions described above in relation to FIG. 4. In some embodiments, the second network node 112 may comprise the following arrangement depicted in FIG. 9a.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 111, and will thus not be repeated here.

In FIG. 9, optional modules are indicated with dashed boxes.

The embodiments herein in the second network node 112 may be implemented through one or more processors, such as a processor 903 in the second network node 112 depicted in FIG. 9a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 904 comprising one or more memory units. The memory 904 is arranged to be used to store obtained information, store data, configurations, schedulings, and applications etc. to perform the methods herein when being executed in the second network node 112.

In some embodiments, the second network node 112 may receive information from, e.g., the first network node 111 and/or the wireless device 130, through a receiving port 905. In some embodiments, the receiving port 905 may be, for example, connected to one or more antennas in second network node 112. In other embodiments, the second network node 112 may receive information from another structure in the wireless communications network 100 through the receiving port 905. Since the receiving port 905 may be in communication with the processor 903, the receiving port 905 may then send the received information to the processor 903. The receiving port 905 may also be configured to receive other information.

The processor 903 in the second network node 112 may be further configured to transmit or send information to e.g., the first network node 111 and/or the wireless device 130, or another structure in the wireless communications network 100, through a sending port 906, which may be in communication with the processor 903, and the memory 904.

Those skilled in the art will also appreciate that the receiving unit 901, the sending unit 902, the scheduling unit 910 and the other units 911 described above may refer to a combination of analog and digital modules, and/or one or more processors configured with software and/or firmware, e.g., stored in memory, that, when executed by the one or more processors such as the processor 903, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-902 and 910-911 described above may be implemented as one or more applications running on one or more processors such as the processor 903.

Thus, the methods according to the embodiments described herein for the second network node 112 may be respectively implemented by means of a computer program 907 product, comprising instructions, i.e., software code portions, which, when executed on at least one processor 903, cause the at least one processor 903 to carry out the actions described herein, as performed by the second network node 112. The computer program 907 product may be stored on a computer-readable storage medium 908. The computer-readable storage medium 908, having stored thereon the computer program 907, may comprise instructions which, when executed on at least one processor 903, cause the at least one processor 903 to carry out the actions described herein, as performed by the second network node 112. In some embodiments, the computer-readable storage medium 908 may be a non-transitory computer-readable storage medium, such as a CD ROM disc, or a memory stick. In other embodiments, the computer program 907 product may be stored on a carrier containing the computer program 907 just described, wherein the carrier is one of an electronic signal, optical signal, radio signal, or the computer-readable storage medium 908, as described above.

The second network node 112 may comprise a communication interface configured to facilitate communications between the second network node 112 and other nodes or devices, e.g., the second network node 112 and/or the wireless device 130. The interface may, for example, include a transceiver configured to transmit and receive radio signals over an air interface in accordance with a suitable standard.

In other embodiments, the second network node 112 may comprise the following arrangement depicted in FIG. 9b. The second network node 112 may comprise a processing circuitry 903, e.g., one or more processors such as the processor 903, in the second network node 112 and the memory 904. The second network node 112 may also comprise a radio circuitry 909, which may comprise e.g., the receiving port 905 and the sending port 906. The processing circuitry 903 may be configured to, or operable to, perform the method actions according to FIG. 4, in a similar manner as that described in relation to FIG. 9a. The radio circuitry 909 may be configured to set up and maintain at least a wireless connection with the first network node 111 and/or the wireless device 130. Circuitry may be understood herein as a hardware component.

Hence, embodiments herein also relate to the second network node 112 comprising the processing circuitry 903 and the memory 904, said memory 904 containing instructions executable by said processing circuitry 903, whereby the second network node 112 is operative to perform the actions described herein in relation to the second network node 112, e.g., in FIG. 4.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Examples related to embodiments herein and further extensions and variations will now be described.

Figure 10:
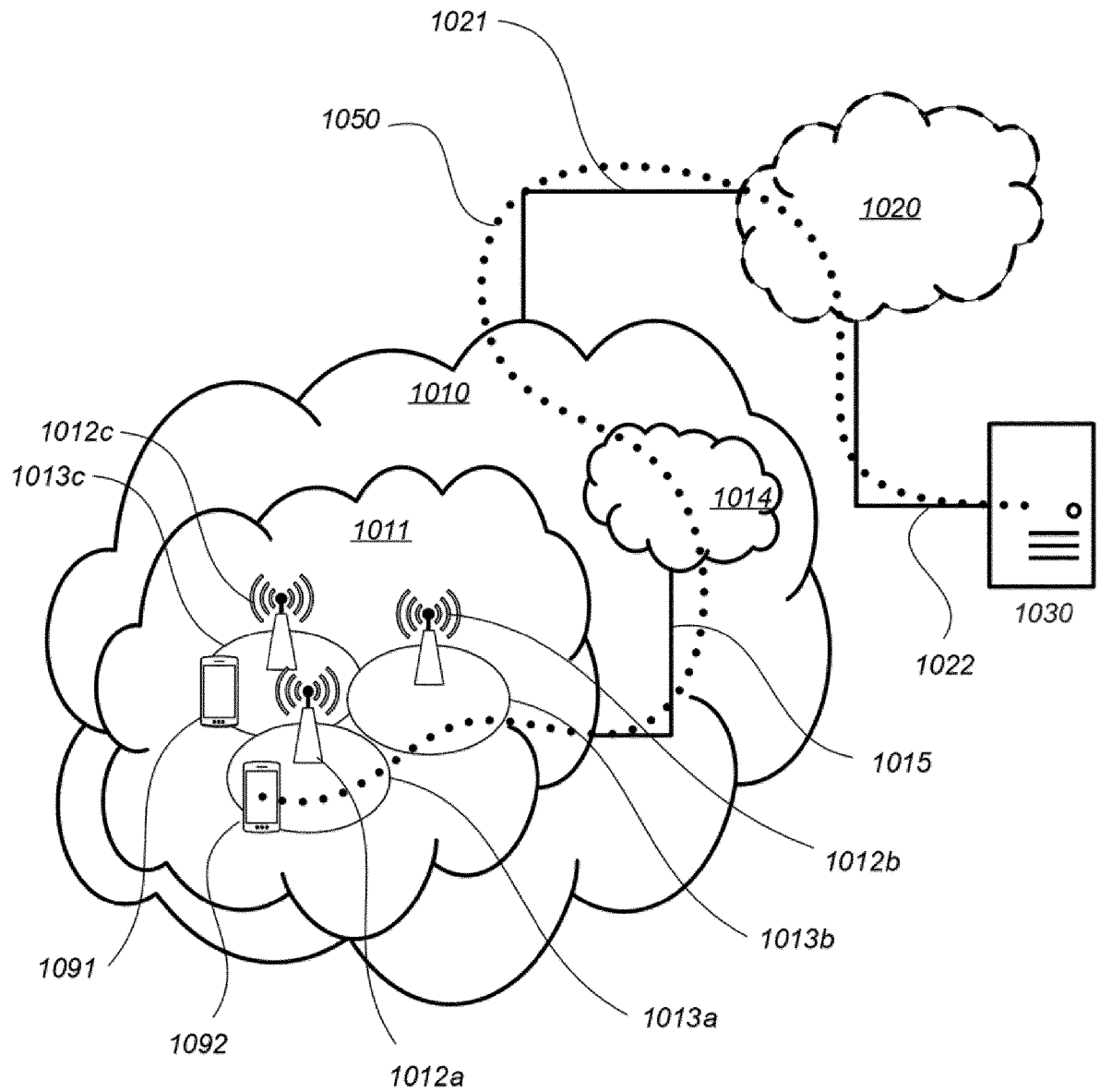
FIG. 10 is a schematic block diagram illustrating a telecommunication network connected via an intermediate network to a host computer, according to embodiments herein.

FIG. 10: Telecommunication network connected via an intermediate network to a host computer in accordance with some embodiments With reference to FIG. 10, in accordance with an embodiment, a communication system includes telecommunication network 1010 such as the wireless communications network 100, for example, a 3GPP-type cellular network, which comprises access network 1011, such as a radio access network, and core network 1014. Access network 1011 comprises a plurality of network nodes such as any of the first network node 111 and the second network node 112. For example, base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A plurality of wireless devices, such as the wireless device 130 are comprised in the wireless communications network 100. In FIG. 10, a first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012. Any of the UEs 1091, 1092 are examples of the wireless device 130.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

In relation to FIGS. 11, 12, 13, 14, and 15, which are described next, it may be understood that a UE is an example of the wireless device 130, and that any description provided for the UE equally applies to the wireless device 130. It may be also understood that the base station is an example of any of the first network node 111 and the second network node 112, and that any description provided for the base station equally applies to any of the first network node 111 and the second network node 112.

FIG. 11: Host computer communicating via a base station with a user equipment over a partially wireless connection in accordance with some embodiments Example implementations, in accordance with an embodiment, of the wireless device 130, e.g., a UE, the network node 110, e.g., a base station and host computer discussed in the preceding paragraphs will now be described with reference to FIG. 11. In communication system 1100, such as the wireless communications network 100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes any of the first network node 111 and the second network node 112, exemplified in FIG. 11 as a base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with the wireless device 130, exemplified in FIG. 11 as a UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the coverage and data rate, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 13: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
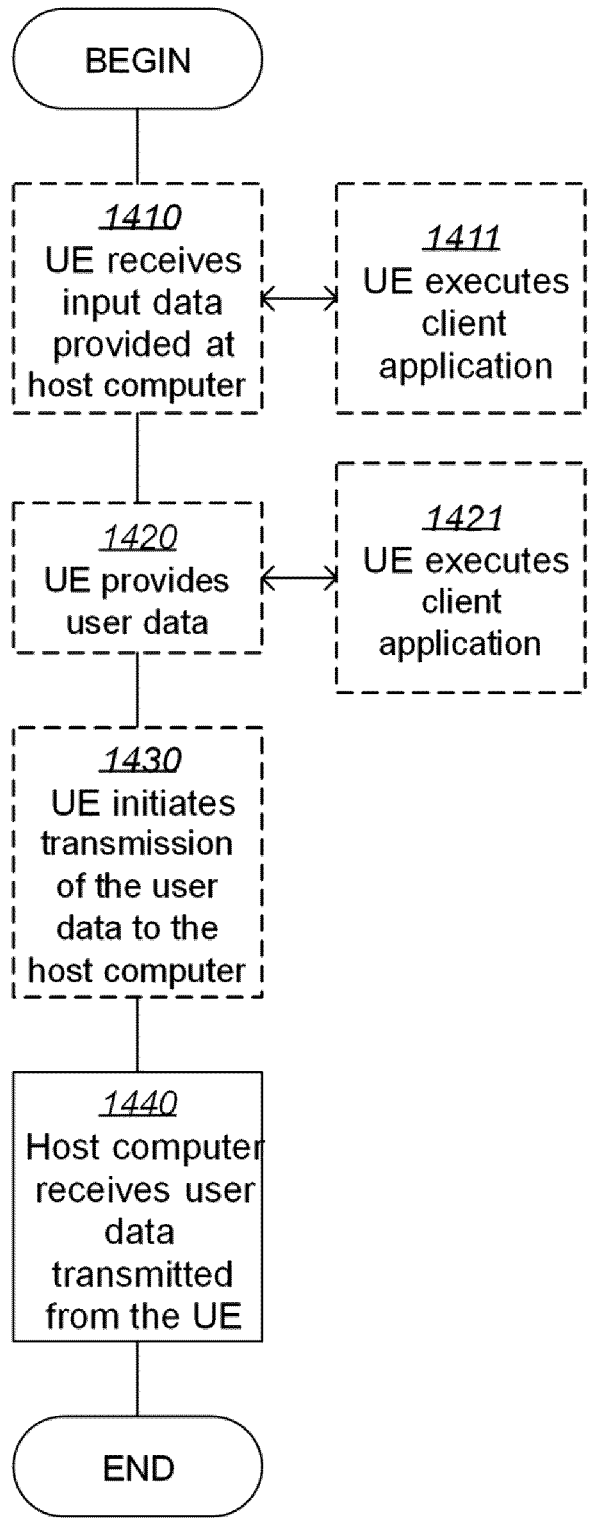
FIG. 14 is a flowchart depicting embodiments of a method in a communications system including a host computer, a base station and a user equipment, according to embodiments herein.

FIG. 14: Methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
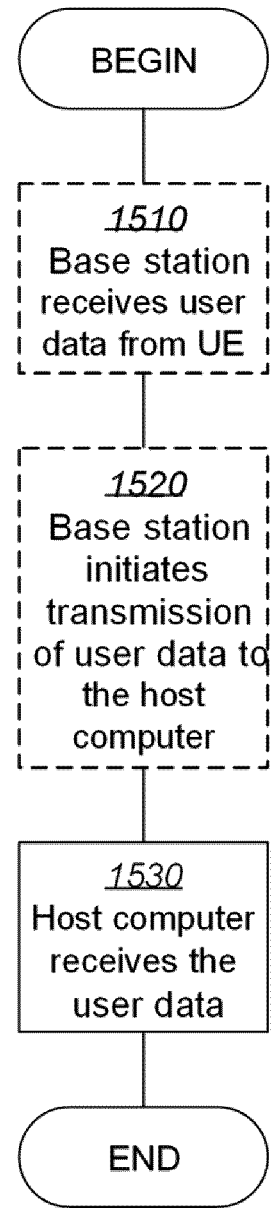
FIG. 15 is a flowchart depicting embodiments of a method in a communications system including a host computer, a base station and a user equipment, according to embodiments herein.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further numbered embodiments will now be described.

Embodiment 1. A base station configured to communicate with a user equipment (UE). The base station includes a radio interface and processing circuitry configured to perform one or more of the actions described herein as performed by any of the first network node 111 and the second network node 112.

Embodiment 2. A communication system including a host computer including: processing circuitry configured to provide user data; and a communication interface configured to forward the user data to a cellular network for transmission to a user equipment (UE). The cellular network includes a base station having a radio interface and processing circuitry. The base station's processing circuitry is configured to perform one or more of the actions described herein as performed by any of the first network node 111 and the second network node 112.

Embodiment 3. The communication system of embodiment 2, further including the base station.

Embodiment 4. The communication system of embodiment 36, further including the UE, wherein the UE is configured to communicate with the base station.

Embodiment 5. The communication system of embodiment 4, wherein:
the processing circuitry of the host computer is configured to execute a host application, thereby providing the user data; and the UE includes processing circuitry configured to execute a client application associated with the host application.

Embodiment 6. A method implemented in a base station, including one or more of the actions described herein as performed by any of the first network node 111 and the second network node 112.

Embodiment 7. A method implemented in a communication system including a host computer, a base station and a user equipment (UE). The method including:
at the host computer, providing user data; and at the host computer, initiating a transmission carrying the user data to the UE via a cellular network including the base station. The base station performs one or more of the actions described herein as performed by any of the first network node 111 and the second network node 112.

Embodiment 8. The method of embodiment 7, further including: at the base station, transmitting the user data.

Embodiment 9. The method of embodiment 8, wherein the user data is provided at the host computer by executing a host application. The method further including: at the UE, executing a client application associated with the host application.

Embodiment 10. A user equipment (UE) configured to communicate with a base station. The UE includes a radio interface and processing circuitry configured to perform one or more of the actions described herein as performed by the wireless device 130.

Embodiment 11. A communication system including a host computer including: processing circuitry configured to provide user data; and a communication interface configured to forward user data to a cellular network for transmission to a user equipment (UE). The UE includes a radio interface and processing circuitry. The UE's processing circuitry is configured to perform one or more of the actions described herein as performed by the wireless device 130.

Embodiment 12. The communication system of embodiment 11, further including the UE.

Embodiment 13. The communication system of embodiment 12, wherein the cellular network further includes a base station configured to communicate with the UE.

Embodiment 14. The communication system of embodiment 12 or 13, wherein: the processing circuitry of the host computer is configured to execute a host application, thereby providing the user data; and the UE's processing circuitry is configured to execute a client application associated with the host application.

Embodiment 15. A method implemented in a user equipment (UE), including one or more of the actions described herein as performed by the wireless device 130.

Embodiment 16. A method implemented in a communication system including a host computer, a base station and a user equipment (UE). The method including: at the host computer, providing user data; and at the host computer, initiating a transmission carrying the user data to the UE via a cellular network including the base station. The UE performs one or more of the actions described herein as performed by the wireless device 130.

Embodiment 17. The method of embodiment 16, further including:
at the UE, receiving the user data from the base station.

Embodiment 18. A user equipment (UE) configured to communicate with a base station. The UE including a radio interface and processing circuitry configured to perform one or more of the actions described herein as performed by the wireless device 130.

Embodiment 19. A communication system including a host computer including: a communication interface configured to receive user data originating from a transmission from a user equipment (UE) to a base station. The UE includes a radio interface and processing circuitry, the UE's processing circuitry configured to: perform one or more of the actions described herein as performed by the wireless device 130.

Embodiment 20. The communication system of embodiment 19, further including the UE.

Embodiment 21. The communication system of embodiment 20, further including the base station. The base station includes a radio interface configured to communicate with the UE and a communication interface configured to forward to the host computer the user data carried by a transmission from the UE to the base station.

Embodiment 22. The communication system of embodiment 20 or 21, wherein: the processing circuitry of the host computer is configured to execute a host application; and the UE's processing circuitry is configured to execute a client application associated with the host application, thereby providing the user data.

Embodiment 23. The communication system of embodiment 46 or 47, wherein: the processing circuitry of the host computer is configured to execute a host application, thereby providing request data; and the UE's processing circuitry is configured to execute a client application associated with the host application, thereby providing the user data in response to the request data.

Embodiment 24. A method implemented in a user equipment (UE), including one or more of the actions described herein as performed by the wireless device 130.

Embodiment 25. The method of embodiment 24, further including: providing user data; and forwarding the user data to a host computer via the transmission to the base station.

Embodiment 26. A method implemented in a communication system including a host computer, a base station and a user equipment (UE). The method including: at the host computer, receiving user data transmitted to the base station from the UE, wherein the UE performs one or more of the actions described herein as performed by the wireless device 130.

Embodiment 27. The method of embodiment 26, further including:
at the UE, providing the user data to the base station.

Embodiment 28. The method of embodiment 27, further including: at the UE, executing a client application, thereby providing the user data to be transmitted; and at the host computer, executing a host application associated with the client application.

Embodiment 29. The method of embodiment 27, further including:
at the UE, executing a client application; and at the UE, receiving input data to the client application, the input data being provided at the host computer by executing a host application associated with the client application. The user data to be transmitted is provided by the client application in response to the input data.

Embodiment 30. A base station configured to communicate with a user equipment (UE). The base station includes a radio interface and processing circuitry configured to perform one or more of the actions described herein as performed by any of the first network node 111 and the second network node 112.

Embodiment 31. A communication system including a host computer comprising a communication interface configured to receive user data originating from a transmission from a user equipment (UE) to a base station. The base station includes a radio interface and processing circuitry. The base station's processing circuitry is configured to perform one or more of the actions described herein as performed by any of the first network node 111 and the second network node 112.

Embodiment 32. The communication system of embodiment 31, further including the base station.

Embodiment 33. The communication system of embodiment 32, further including the UE. The UE is configured to communicate with the base station.

Embodiment 34. The communication system of embodiment 33, wherein:
the processing circuitry of the host computer is configured to execute a host application. The UE is configured to execute a client application associated with the host application, thereby providing the user data to be received by the host computer.

Embodiment 35. A method implemented in a base station, including one or more of the actions described herein as performed by any of the first network node 111 and the second network node 112.

Embodiment 36. A method implemented in a communication system including a host computer, a base station and a user equipment (UE). The method including: at the host computer, receiving, from the base station, user data originating from a transmission which the base station has received from the UE. The UE performs one or more of the actions described herein as performed by the wireless device 130.

Embodiment 37. The method of embodiment 36, further including: at the base station, receiving the user data from the UE.

Embodiment 38. The method of embodiment 37, further including: at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
CDM Code Division Multiplex
CQI Channel Quality Information
CRC Cyclic Redundancy Check
DCI Downlink Control Information
DFT Discrete Fourier Transform
DM-RS Demodulation Reference Signal
FDM Frequency Division Multiplex
HARQ Hybrid Automatic Repeat Request
OFDM Orthogonal Frequency Division Multiplex
PAPR Peak to Average Power Ratio
PUCCH Physical Uplink Control Channel
PUSCH Physical Uplink Shared Channel
SRS Sounding Reference Signal
PRACH Physical Random Access Channel
DC Dual-connectivity
PRB Physical Resource Block
RRC Radio Resource Control
UCI Uplink Control Information
EIRP Effective Isotropic Radiated Power
SS-block Synchronisation Signal Block
CSI-RS Channel State Information Reference Signal
PBCH Primary Broadcast Channel Claims are provided below. Reference numbers/letters are provided in parenthesis by way of example/illustration without limiting claims to particular elements indicated by reference numbers/letters.

The invention claimed is:

1. A method performed by a wireless device configured with dual connectivity between a first group of cells and a second group of cells, the method comprising:
determining a limit of a power of transmission of a first uplink transmission in the first group of cells, wherein the limit is determined based on an identified second uplink transmission in the second group of cells overlapping in time with the first uplink transmission, wherein the determining comprises:
using a first power limit to determine the power of transmission for the first uplink transmission when the wireless device detects a downlink grant or assignment set to trigger the second uplink transmission in the second group of cells that overlaps with the first uplink transmission where the downlink grant or assignment is detected before a first time offset immediately preceding a start of the first uplink transmission; and
in an absence of the detection of the downlink grant or assignment, using a second power limit to determine the power of transmission for the first uplink transmission; and
setting the power of transmission for the first uplink transmission based on the limit.

2. The method of claim 1, wherein the identified second uplink transmission in the second group of cells overlapping with the first uplink transmission is based on a detection of a downlink grant or assignment that triggers the second uplink transmission in the second group of cells that would overlap in time with the first uplink transmission.

3. The method of claim 2, wherein the detection of a downlink grant or assignment that triggers the second uplink transmission is based on a second time offset in relation to a beginning of a time of transmission of the first uplink transmission.

4. The method of claim 3, wherein the identified second uplink transmission is based on obtaining from a network node one or more parameters of the second group of cells.

5. The method of claim 4, wherein the one or more parameters for the second group of cells comprises:
   a time division duplex uplink or downlink configuration for transmission or reception on a serving cell or bandwidth portion, BWP, in the second group of cells;
   a configuration for a transmission of at least one configured uplink grant for a serving cell or BWP in the second group of cells;
   a slot format indicator for a serving cell or BWP in the second group of cells; and
   at least one higher layer configured parameter.

6. The method of claim 4, wherein the one or more parameters for the second group of cells is determined based on semi-static signalling.

7. The method of claim 4, wherein the determining is further based on:
   a prediction, based on the one or more parameters, of a first downlink transmission set to trigger the second uplink transmission, in a time period preceding a beginning of the transmission of the first uplink transmission; and
   the detecting the first downlink transmission.

8. The method of claim 1, wherein the determining comprises identifying that a combined power of transmission across the first group of cells and the second group of cells is less than a threshold amount of power.

9. The method of claim 1, wherein the determining comprises using the limit to identify the power of transmission for the first uplink transmission.

10. The method of claim 3, wherein the first time offset and the second time offset are the same.

11. The method of claim 1, wherein the first power limit is less than the second power limit.

12. The method of claim 1, wherein the first time offset is based on a capability signaling from the wireless device.

13. The method of claim 1, wherein the first time offset is based on whether a synchronous dual connectivity operation or an asynchronous dual connectivity operation is used.

14. The method of claim 1, wherein the first time offset includes a timing difference between the first group of cells and the second group of cells.

15. A wireless device comprising:
   processing circuitry; and
   memory coupled with the processing circuitry, wherein the memory includes instructions that when executed by the processing circuitry causes the wireless device to perform operations according to claim 1.

16. A wireless device adapted to perform the steps of claim 1.

* * * * *

UNITED STATES PATENT AND TRADEMARK OFFICE
CERTIFICATE OF CORRECTION

| | |
|---|---|
| PATENT NO. | : 12,035,246 B2 |
| APPLICATION NO. | : 17/599189 |
| DATED | : July 9, 2024 |
| INVENTOR(S) | : Koorapaty et al. |

It is certified that error appears in the above-identified patent and that said Letters Patent is hereby corrected as shown below:

On the Title Page

On Page 2, item (56), under "OTHER PUBLICATIONS", in Column 2, Line 8, delete "Internatinoal" and insert -- International --, therefor.

In the Specification

In Column 2, Line 54, delete "its" and insert -- to its --, therefor.

In Column 2, Line 65, delete "Discontinued" and insert -- Discontinuous --, therefor.

In Column 4, Line 17, delete "one of" and insert -- one or --, therefor.

In Column 4, Line 47, delete "operation" and insert -- operate --, therefor.

In Column 6, Line 13, delete "determines" and insert -- it determines --, therefor.

In Column 7, Line 25, delete "depicted" and insert -- depicted in --, therefor.

In Column 10, Lines 7-8, delete "transmission;" and insert -- transmission, --, therefor.

In Column 10, Line 33, delete "group" and insert -- group. --, therefor.

In Column 11, Line 36, delete "a the" and insert -- a/the --, therefor.

In Column 12, Line 58, delete "refer" and insert -- refer to --, therefor.

In Column 12, Line 62, delete "a/the a" and insert -- a/the --, therefor.

In Column 12, Line 63, delete "refer" and insert -- refer to --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 12,035,246 B2

In Column 12, Line 64, delete "a/the a" and insert -- a/the --, therefor.

In Column 12, Line 65, delete "refer" and insert -- refer to --, therefor.

In Column 14, Line 16, delete "refer" and insert -- refer to --, therefor.

In Column 14, Line 20, delete "a/the a" and insert -- a/the --, therefor.

In Column 14, Line 21, delete "refer" and insert -- refer to --, therefor.

In Column 14, Line 22, delete "a/the a" and insert -- a/the --, therefor.

In Column 14, Line 23, delete "refer" and insert -- refer to --, therefor.

In Column 14, Line 39, delete "TO," and insert -- T0, --, therefor.

In Column 14, Lines 42-43, delete "TO-T_offset" and insert -- T0-T_offset --, therefor.

In Column 14, Line 47, delete "TO-T_offset" and insert -- T0-T_offset --, therefor.

In Column 14, Line 52, delete "B)" and insert -- B). --, therefor.

In Column 15, Line 32, delete "that that" and insert -- that --, therefor.

In Column 17, Line 35, delete "case" and insert -- Case --, therefor.

In Column 17, Line 57, delete "TO," and insert -- T0, --, therefor.

In Column 17, Line 60, delete "b." and insert -- a. --, therefor.

In Column 17, Lines 60-61, delete "TO-T_offset" and insert -- T0-T_offset --, therefor.

In Column 17, Line 64, delete "c." and insert -- b. --, therefor.

In Column 17, Line 66, delete "TO-T_offset" and insert -- T0-T_offset --, therefor.

In Column 18, Line 48, delete "CD ROM" and insert -- CD-ROM --, therefor.

In Column 19, Line 44, delete "CD ROM" and insert -- CD-ROM --, therefor.

In Column 20, Line 31, delete "CD ROM" and insert -- CD-ROM --, therefor.

In Column 21, Line 27, delete "CD ROM" and insert -- CD-ROM --, therefor.

In Column 22, Line 23, delete "CD ROM" and insert -- CD-ROM --, therefor.

CERTIFICATE OF CORRECTION (continued)
U.S. Pat. No. 12,035,246 B2

In Column 23, Line 21, delete "CD ROM" and insert -- CD-ROM --, therefor.

In Column 24, Line 21, delete "embodiments" and insert -- embodiments. --, therefor.

In Column 25, Line 28, delete "embodiments" and insert -- embodiments. --, therefor.

In Column 28, Line 66, delete "according" and insert -- according to --, therefor.

In Column 32, Line 16, delete "Information" and insert -- Indicator --, therefor.

In Column 32, Line 23, delete "Multiplex" and insert -- Multiplexing --, therefor.

In the Claims

In Column 34, Line 4, in Claim 7, delete "detecting" and insert -- detecting of --, therefor.